United States Patent [19]

Barlow et al.

[11] Patent Number: 4,558,429
[45] Date of Patent: Dec. 10, 1985

[54] PAUSE APPARATUS FOR A MEMORY CONTROLLER WITH INTERLEAVED QUEUING APPARATUS

[75] Inventors: George J. Barlow, Tewksbury; Chester M. Nibby, Jr., Peabody; Robert B. Johnson, Billerica, all of Mass.

[73] Assignee: Honeywell Information Systems Inc., Waltham, Mass.

[21] Appl. No.: 331,933

[22] Filed: Dec. 17, 1981

[51] Int. Cl.[4] .............................................. G06F 9/00
[52] U.S. Cl. .................................................... 364/900
[58] Field of Search ... 364/200 MS File, 900 MS File

[56] References Cited

U.S. PATENT DOCUMENTS 4,236,203  11/1980  Curley et al. ...................... 364/200
4,344,132   8/1982  Dixon et al. ....................... 364/200
4,451,880   5/1984  Johnson et al. .................... 364/200

Primary Examiner—Gareth D. Shaw
Assistant Examiner—John G. Mills
Attorney, Agent, or Firm—Faith F. Driscoll; John S. Solakian

[57] ABSTRACT

A data processing system includes a plurality of memory command generating units which connect to a common bus network with a number of memory subsystems. Each subsystem includes a controller which controls the operation of a number of memory module units and includes a number of queue circuits for storing memory requests to be processed. The memory controller further includes control apparatus connected to monitor bus activity. In response to certain bus activity conditions occurring during multiword transfer operations, the control apparatus operates to lengthen the time between successive multiword transfers of data to the bus so as to ensure that new requestors having lower priorities than a memory controller gain access to an available queue notwithstanding the amount of bus delay incurred in transmitting their memory requests.

30 Claims, 14 Drawing Figures (sheet 1 of 2)

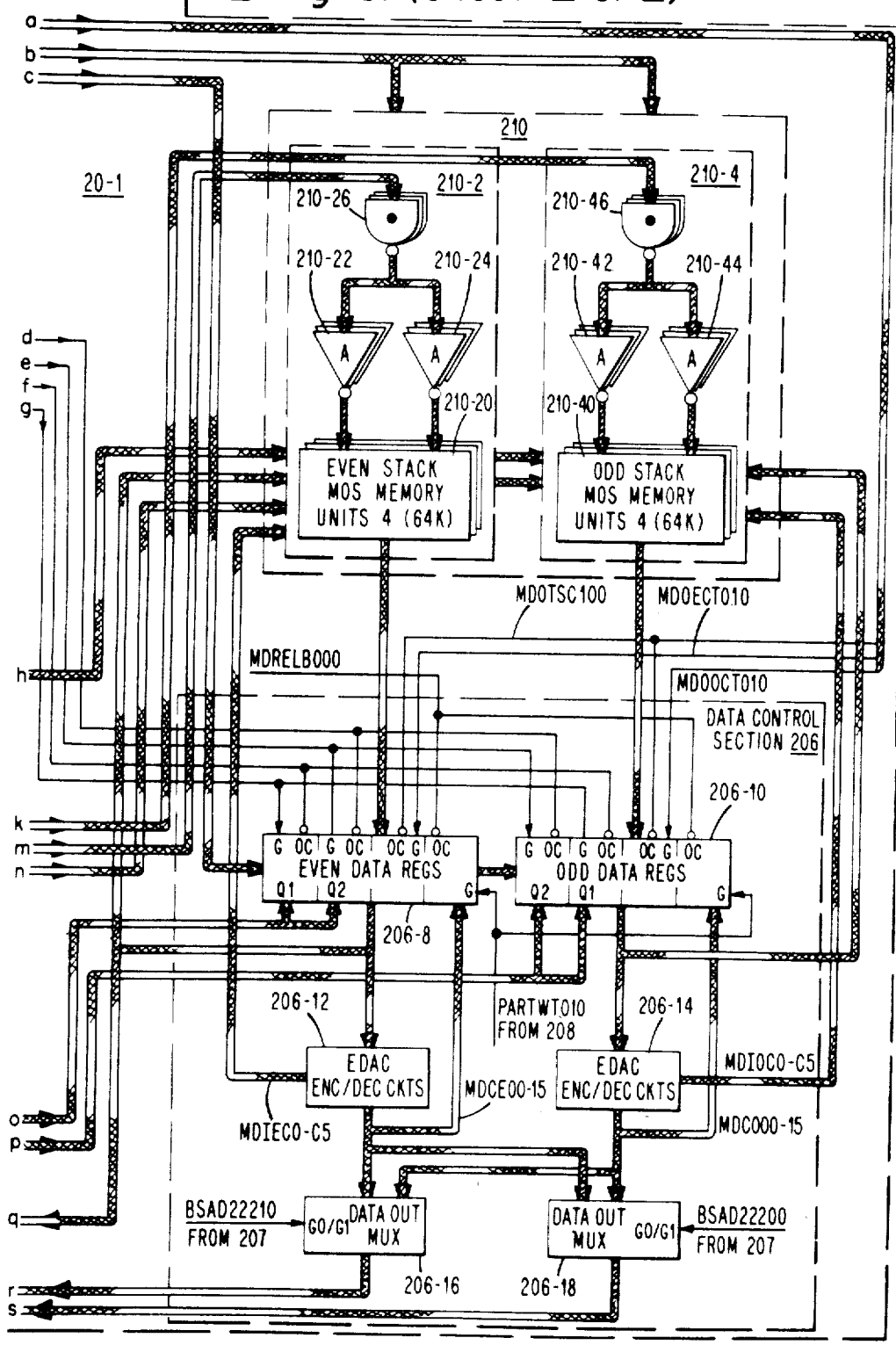
Fig. 3. (sheet 2 of 2)

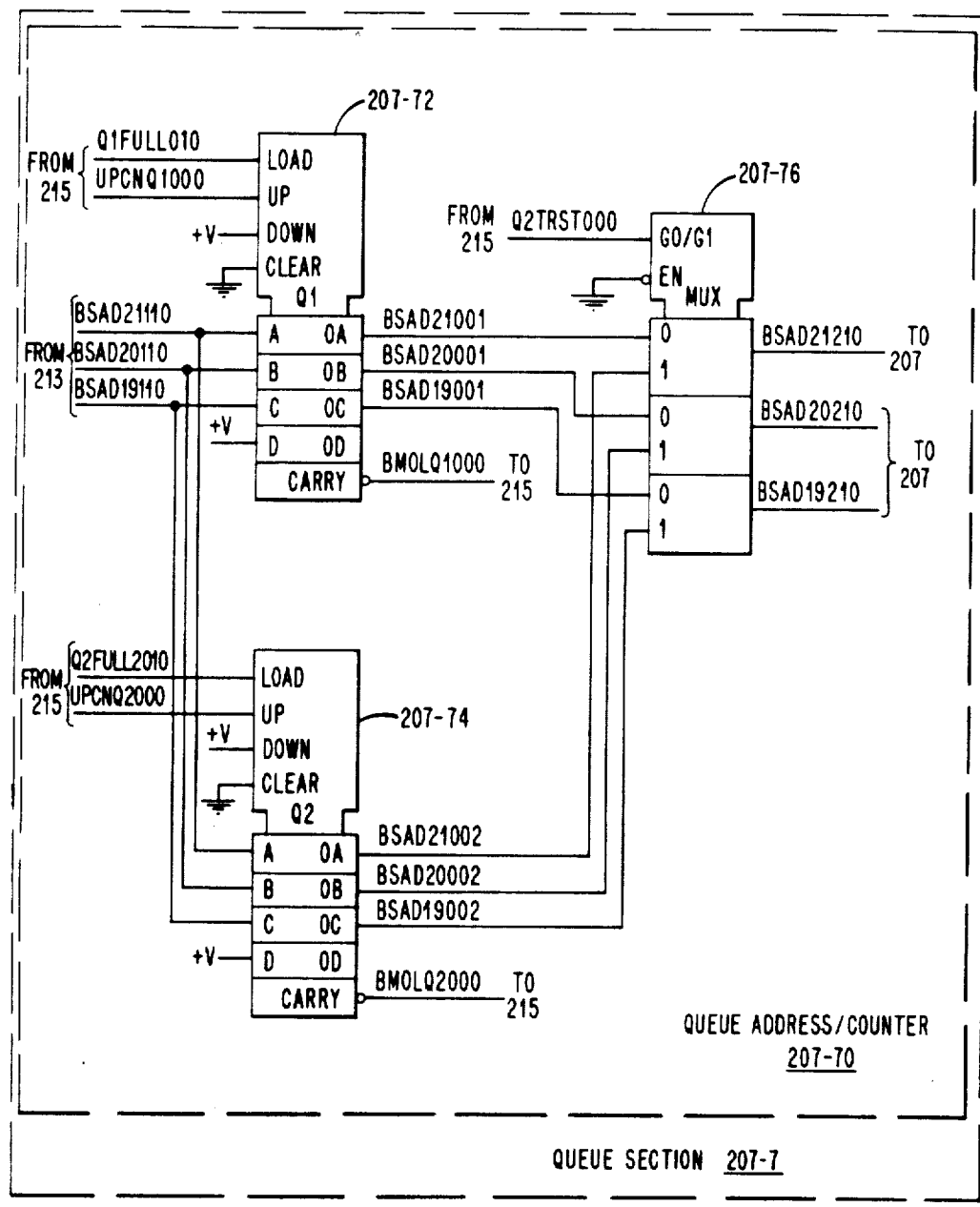
Fig. 4. (sheet 1 of 2)

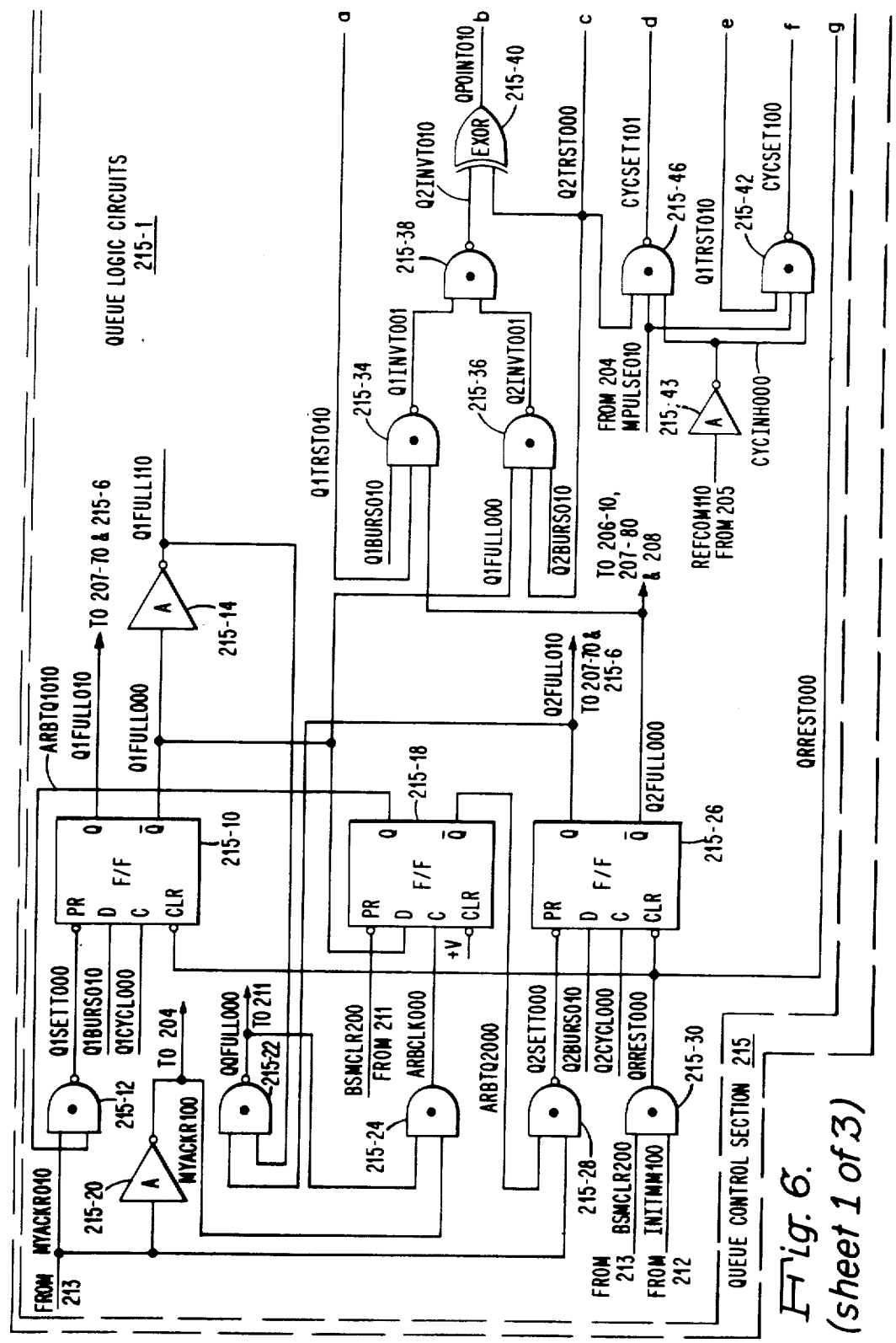
Fig. 6. (sheet 1 of 3)

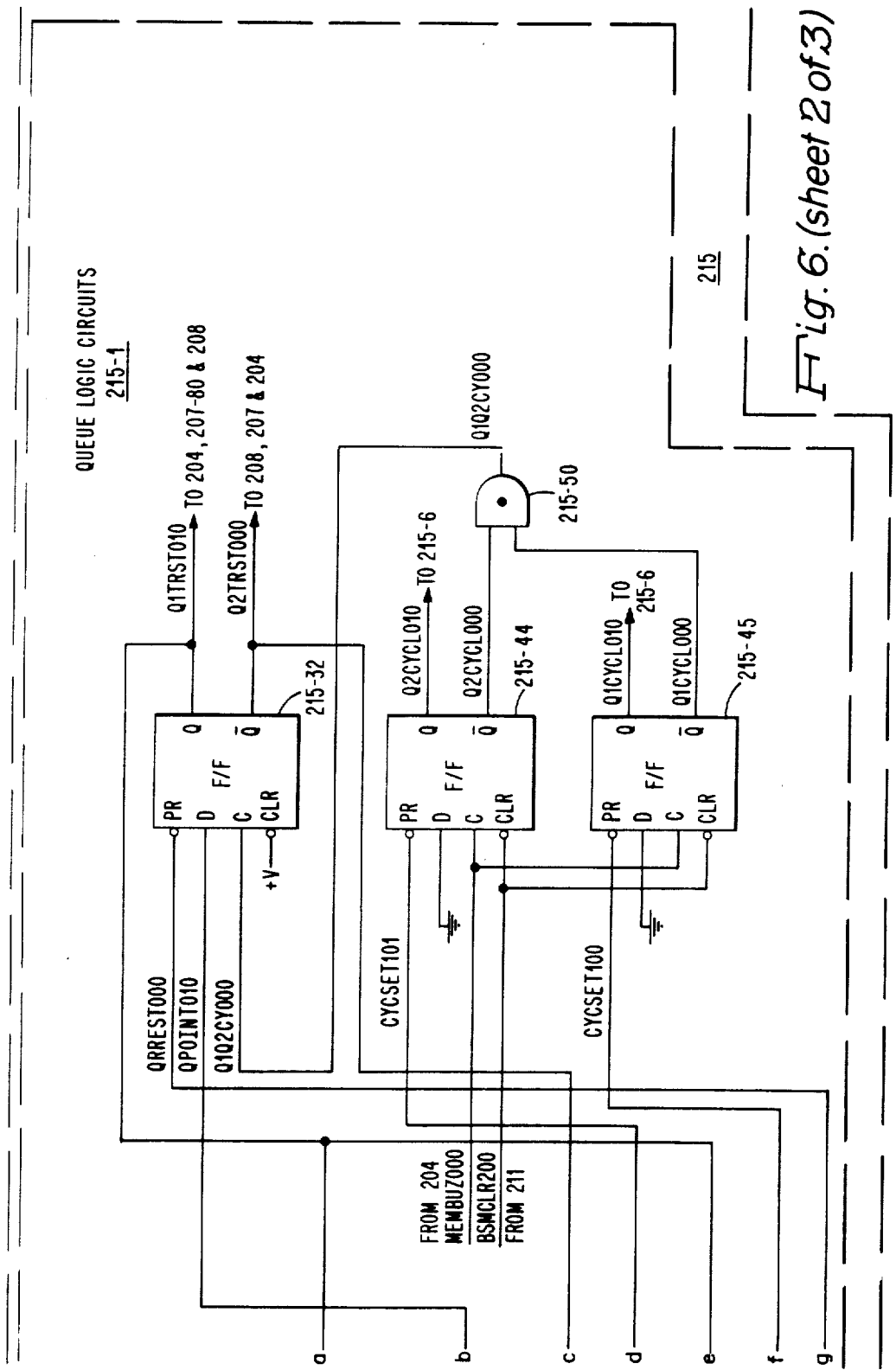
Fig. 6.(sheet 2 of 3)

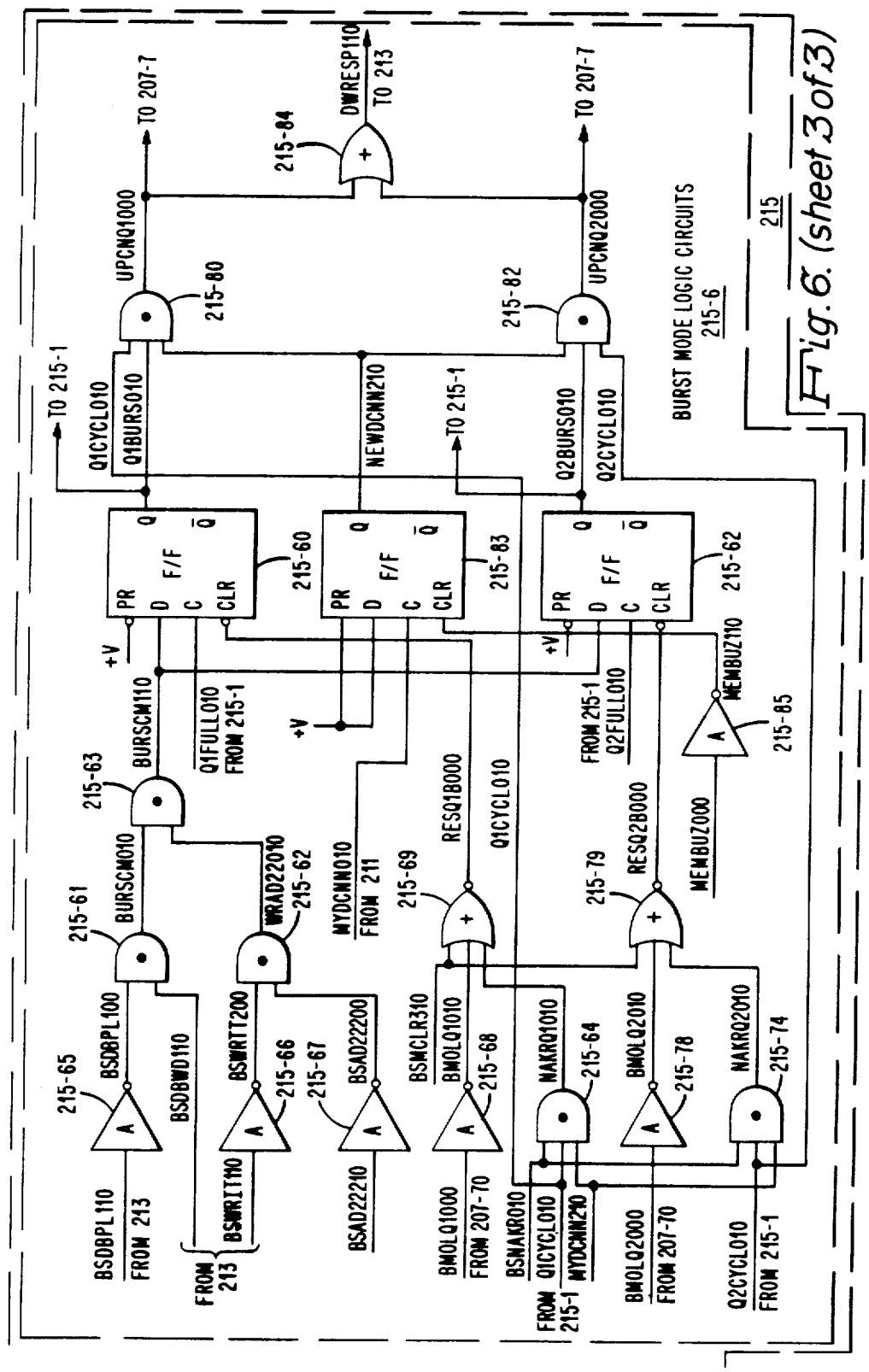
Fig. 6. (sheet 3 of 3)

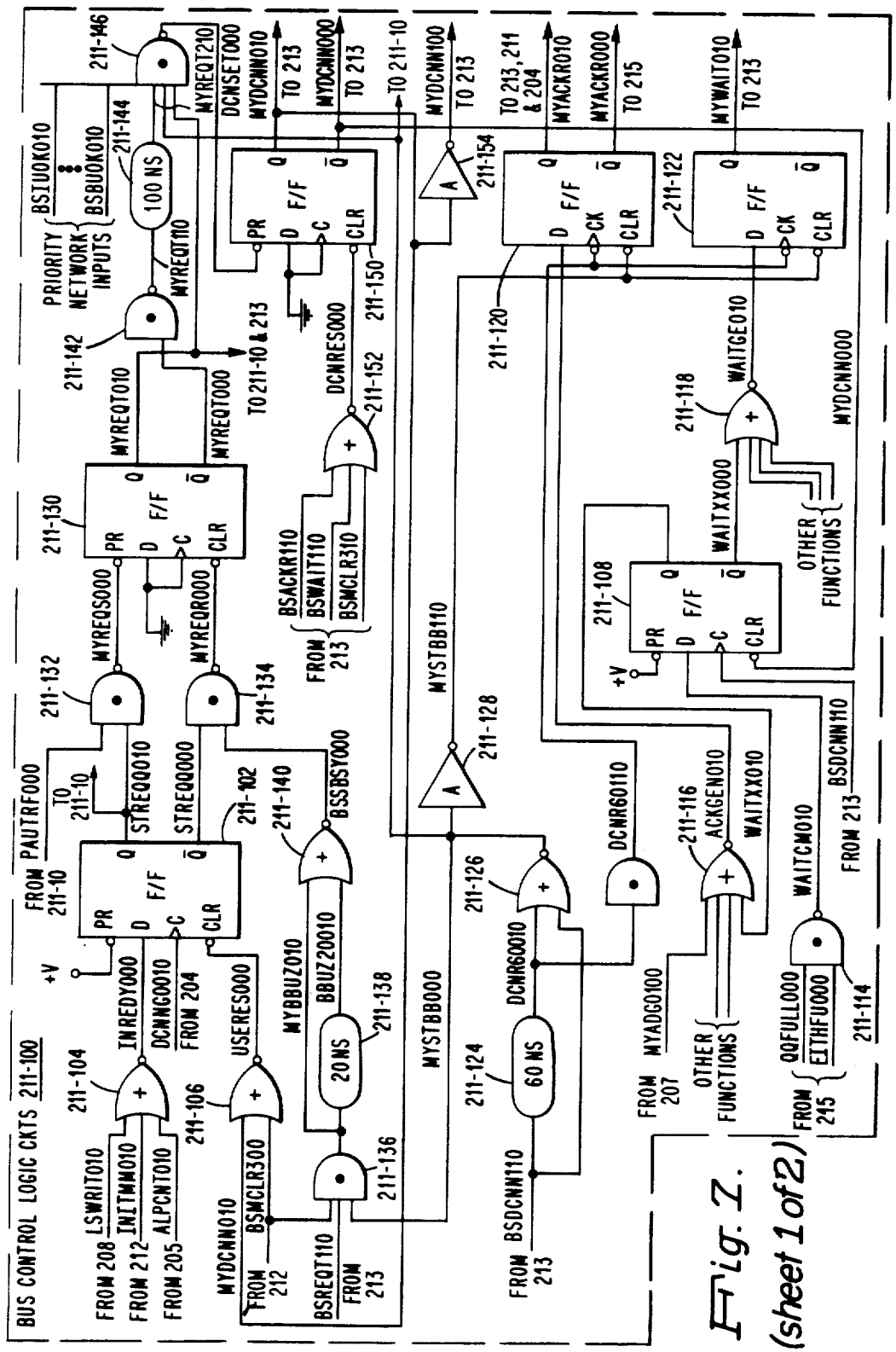
Fig. 2. (sheet 1 of 2)

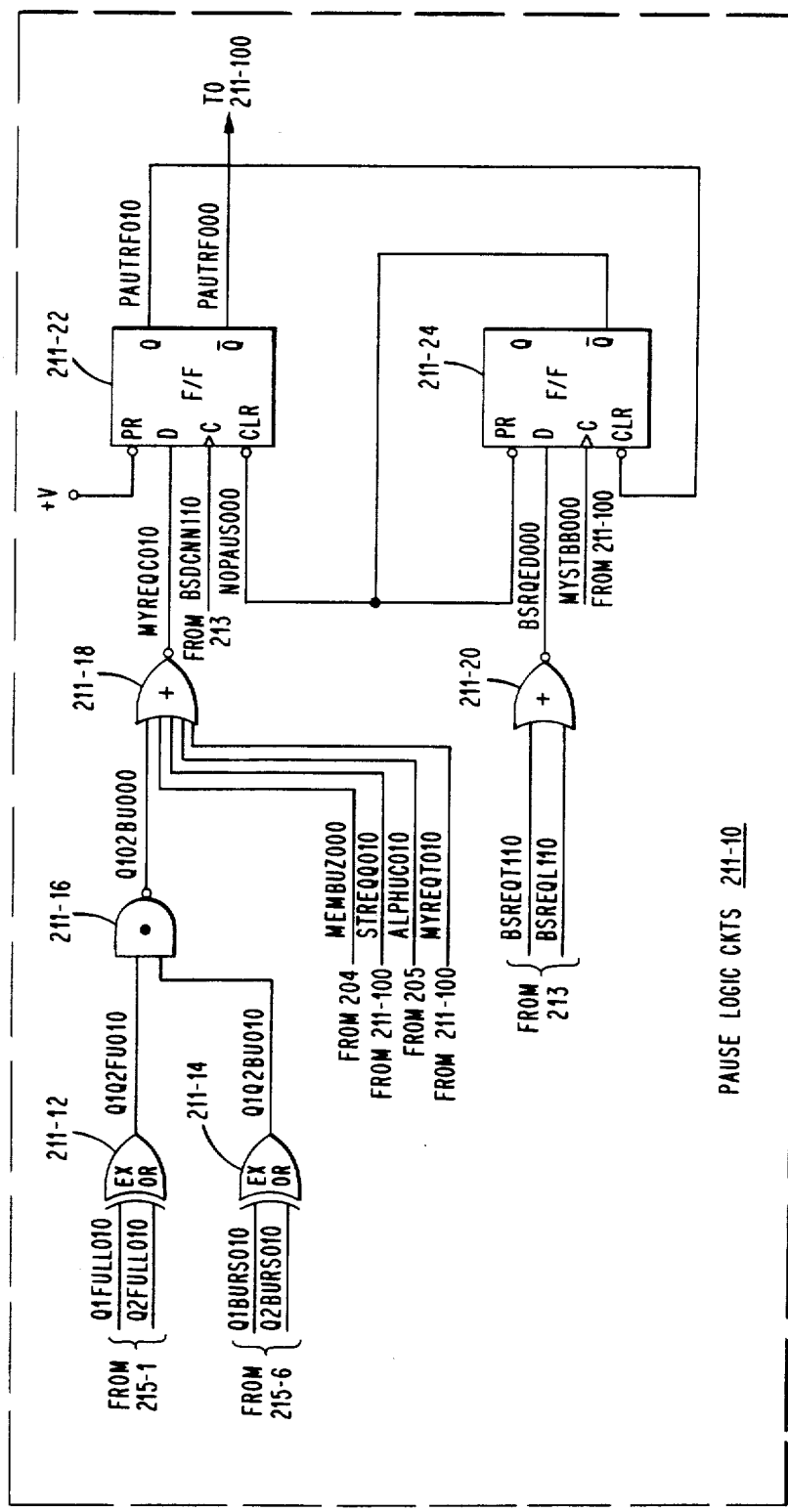
Fig. 2. (sheet 2 of 2)

PAUSE APPARATUS FOR A MEMORY CONTROLLER WITH INTERLEAVED QUEUING APPARATUS

RELATED APPLICATIONS

1. "A Memory Controller with Interleaved Queuing Apparatus", invented by Robert B. Johnson and Chester M. Nibby, Jr., Ser. No. 202,821, filed on Oct. 31, 1980 which issued as U.S. Pat. No. 4,451,880 on May 29, 1984 and is assigned to the same assignee as named herein.

BACKGROUND OF THE INVENTION

1. Field of Use

This invention relates to memory systems and more particularly to memory controller apparatus for processing a plurality of memory requests involving transfers of data between memory systems and data processing units over a common bus.

2. Prior Art

It is well known to construct memory systems from a number of memory modules. In certain prior art systems, memory modules are paired together to provide a double word fetch access capability. The term double word fetch access as used herein refers to the capability of being able to access a pair of words at a time from a memory system during a cycle of operation. This type of system is described in U.S. Pat. No. 4,236,203 titled "System Providing Multiple Fetch Bus Cycle Operation", invented by John L. Curley, Robert B. Johnson, Richard A. Lemay and Chester M. Nibby, Jr., issued Nov. 25, 1980 and assigned to the same assignee as named herein.

In the above prior art system, the memory system connects to an asynchronously operated single word wide bus. In the arrangement a request for multiple words is made in a single bus cycle and the requested information words are delivered to the bus over a series of response cycles. While this arrangement improves the system throughput capabilities, it becomes desirable to be able to provide a memory system able to respond to a plurality of requests involving the transfer over a single bus, groups of multiple words accessed simultaneously during a series of cycles without incurring communication delays. This becomes desirable where it is required to provide a high speed transfer of data to another memory device such as a cache unit or disk device.

The system disclosed in the copending patent application "A Memory Controller with Interleaved Queuing Apparatus" referenced above enables such high speed transfers to take place.

The memory controller of the system includes a plurality of queue circuits. Each of the queue circuits includes an address queue register, a control queue register and at least one data queue register. Each address queue register includes tristate control circuits for enabling independent operation in processing memory requests.

Also, the controller includes control circuits which couple to the address, control and data registers of each of the queue circuits. The control circuits operate to assign memory cycles of operation on an alternate basis when the queue control registers store memory requests which are being processed by the queue circuits.

By interleaving the processing of different types of memory requests, the controller is able to process memory requests in parallel. This eliminates processing delays, particularly in the case where one of the types of memory requests being processed requires a multiword transfer over a number of successive memory cycles of operation. That is, one type of request identified as a burst memory request can involve the transfer of a substantial number of data words to the bus over a number of bus cycles of operation. By interleaving memory cycles between the queue circuits, the processing of non-burst memory requests normally requiring a single memory cycle are not delayed.

While the controller arrangement described above eliminates delays in processing nonburst requests, there are certain system arrangements in which lower priority requesting units are unable to gain access to the controller's empty queue circuit. It has been found that this occurs when the nonburst requests generated by the lower priority requesting units are subjected to long delays prior to receipt by the higher priority controller (e.g. the bus propagation time is 300 nanoseconds or greater).

As a result of the above, the bus network to which the units and controller connect becomes saturated, in such system arrangements, and are prevented from carrying out a single burst operation involving multiple word transfers over successive bus cycles of operation. The result of such conflicts in data transfers is that there is a corresponding loss in system processing throughput.

Accordingly, it is a primary object of the present invention to provide a system which is able to process a plurality of memeory requests specifying data transfers between a memory subsystem and a plurality of devices from such devices with a minimum of conflict.

It is a further object of the present invention to provide a system including a memory controller with apparatus for concurrently processing nonburst requests from a plurality of devices in parallel with a burst request involving the transfer of groups of data words over a common bus network during consecutive bus cycles of operation notwithstanding the positioning of such devices on the bus network.

SUMMARY OF THE INVENTION

The above objects are achieved in a preferred embodiment of the system which includes the apparatus of the present invention.

The system includes an asynchronous multiline bus network which couples to a memory subsystem and a plurality of command generating units (e.g. central processing unit, disk controller, etc.). A tie-breaking bus priority network, distributed through bus control circuits includes within each unit coupled to the bus network, grants bus cycles and resolves simultaneous requests on a priority basis. Priority is granted on the basis of physical position on the bus network. In the system of the invention, the highest priority is given to the memory subsystem and the lowest priority to the central processing unit with the other units being positioned on the basis of their performance requirements.

The memory subsystem of the preferred embodiment includes a memory controller for controlling the operation of a plurality of memory modules. The controller has a plurality of queue circuits, each queue circuit including an address register, a control queue register and at least one data queue register. Also, the controller includes queue control circuits which operate to assign memory cycles of operation to the queue circuits on an alternate basis.

According to the teachings of the present invention, the memory controller further includes burst pause mode control apparatus which couples between the controller's bus control circuits and queue control circuits. The burst mode pause control apparatus operates to monitor bus activity. Upon detecting predetermined activity conditions occurring during a transfer of data words over a number of successive bus cycles of operation (a burst mode operation), the apparatus operates to lengthen the time interval between the occurrence of such successive bus cycles. This is done in a manner which enables new requestors having lower priorities than the memory controller access to an available queue circuit within the controller.

In more particular terms, the burst mode pause control apparatus detects whether or not a bus cycle takes place between memory controller bus data transfer cycles and the full/empty status of the queue circuits. In accordance with the teachings of the present invention, when no bus cycle occurs during the time between successive memory burst data transfer cycles, no action is taken since a new lower priority requesting unit could have accessed an empty queue circuit. Similarly, when a bus cycle occurs between such burst data transfer cycles and the queue is full, no action is taken.

However, in the above case, when the queue is not full, then the pause control apparatus operates to lengthen the time interval between such successive burst data transfer cycles. As soon as the control apparatus of the present invention detects the nonoccurrence of a bus cycle during the pause interval, it enables the memory controller to begin immediately the next successive burst data transfer cycle. In the case where a bus cycle starts during the pause interval, the control apparatus enables the memory controller to begin the next burst data transfer cycle upon the completion of the current bus cycle.

By monitoring the bus network activity in the above manner and controlling the operation of the memory controller during its execution of a burst operation, the apparatus of the present invention prevents the bus network from becoming saturated so as to prevent lower priority units from gaining access to a controller's empty queue. Thus, even though the memory requests of such lower priority units are subjected to substantial delays by the bus network due to bus network length or the units positioning, the apparatus of the present invention prevents such memory requests from undergoing substantial processing delays.

The result is that the invention provides a substantial increase in the system performance. Additionally, it causes a reduction in the number of bus conflicts. That is, the lower priority requestors will not have to reinitiate their requests for access to memory (i.e., only the unit having the highest priority is granted a bus cycle during which it can transfer its request). This result and the above advantages of the present invention are further realized when the number of memory controllers and data requestor units are increased.

The novel features which are believed to be characteristic of the invention both as to its organization and method of operation, together with further objects and advantages will be better understood from the following description when considered in connection with the accompanying drawings. It is to be expressly understood, however, that each of the drawings are given for the purpose of illustration and description only and are not intended as a definition of the limits of the present invention.

BRIEF DESCRIPTION OF THE DRAWINGS

FIGS. 4 through 8 illustrate in greater detail the different portions of the memory subsystem 20-1 of FIG. 3.

GENERAL DESCRIPTION OF SYSTEM OF FIG. 1

Figure 1:
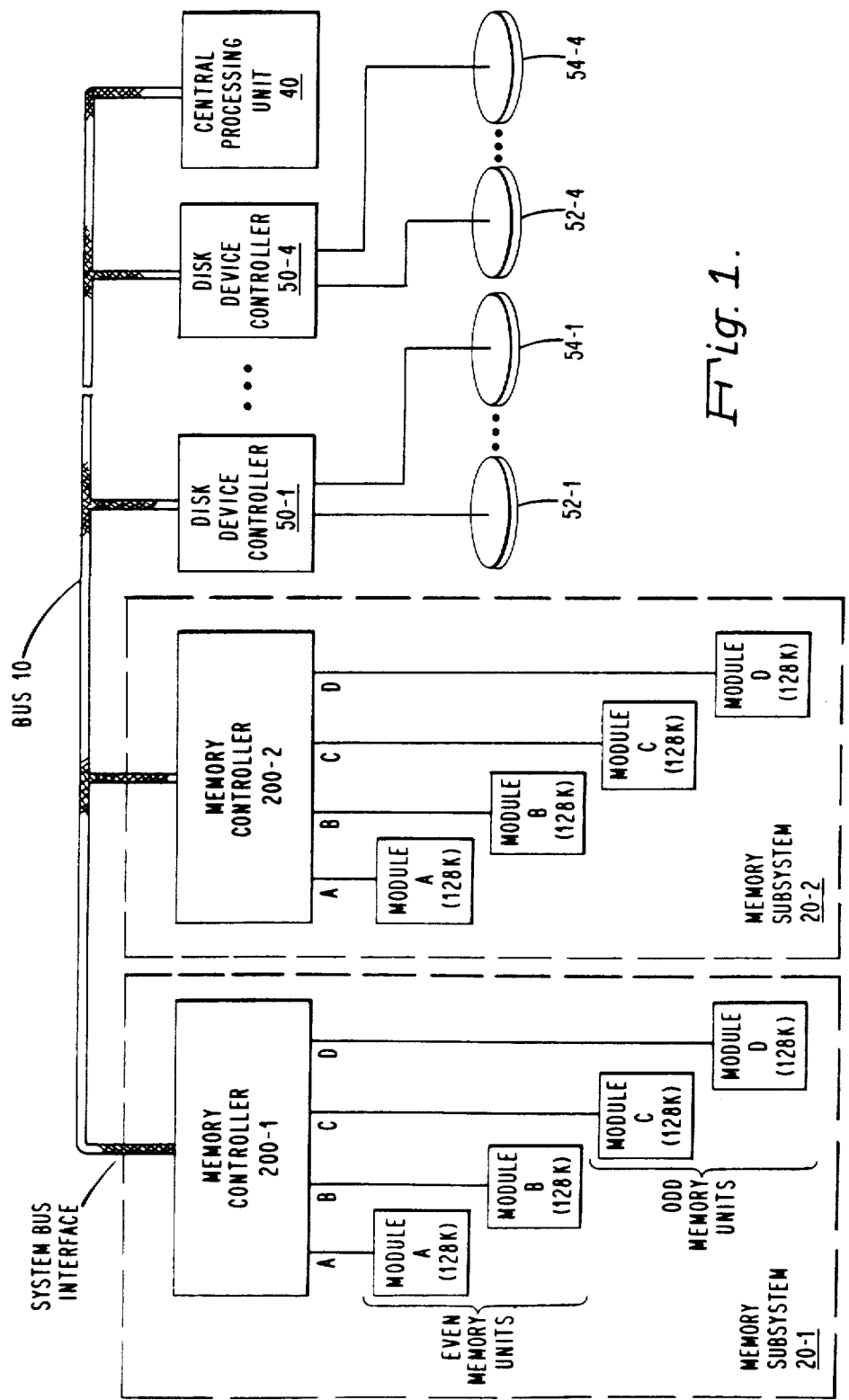
FIG. 1 shows in block diagram form a system which incorporates the apparatus of the present invention.

FIG. 1 illustrates a data processing system which includes the apparatus of the present invention. Referring to FIG. 1, it is seen that the system includes a multiline bus 10 coupled to a plurality of memory subsystems 20-1 and 20-2, to a central processing unit (CPU) 40 and to a plurality of disk device controllers 50-1 through 50-4, each of which controls the operation of one or more disk devices (i.e., 52-1, 52-4, 54-1 and 54-4). While only one type of controller is shown, it will be appreciated that the system of FIG. 1 will normally include other units such as those disclosed in U.S. Pat. No. 4,000,485 issued Dec. 28, 1976. The memory subsystems 20-1 and 20-2, each include a memory controller which can address up to four memory module units. In FIG. 1, each memory controller is connected to address the pairs of memory module units labeled A through D.

The CPU 40 is a microprogrammed processing unit which may for the purposes of the present invention may be considered conventional in design. The copending patent application cited above in addition to U.S. Pat. No. 4,181,974 titled "System Providing Multiple Outstanding Information Requests", invented by Richard A. Lemay and John L. Curley, issued Jan. 1, 1980 and assigned to the same assignee as named herein may be consulted for further details. Also, U.S. Pat. No. 4,371,928 which issued on Feb. 1, 1983 to George J. Barlow, et al., titled "Interface for Controlling Information Transfers between Main Data Processing Systems Units and a Central Subsystem", may also be consulted.

Figure 2:
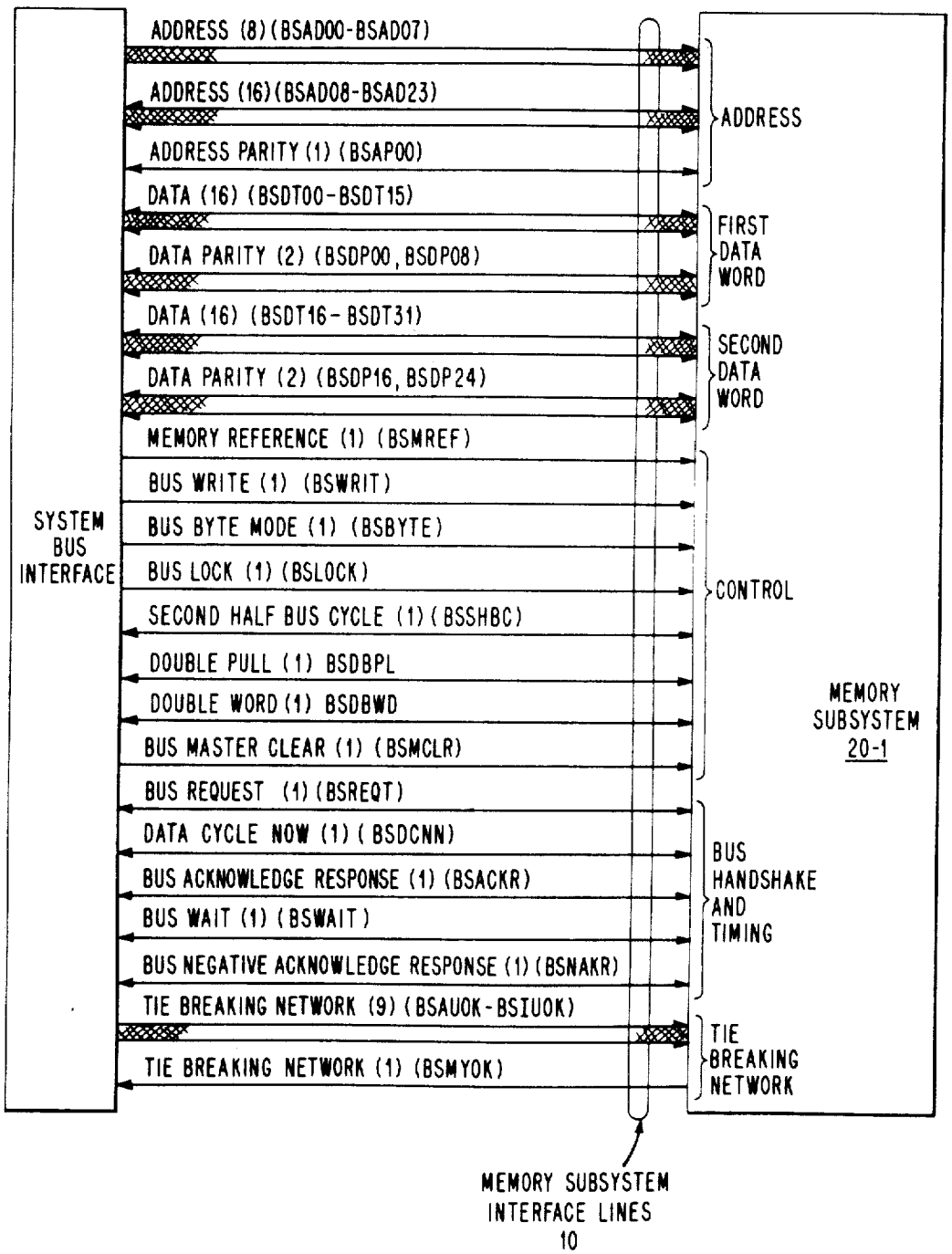
FIG. 2 shows in detail the lines of the asynchronous bus 10 which connect to each of the units of FIG. 1.

The CPU 40 as well as each controller 50-1 through 50-4 and memory subsystems 20-1 and 20-2 communicate over the bus 10 in a predetermined manner as set forth in U.S. Pat. No. 4,000,485. Briefly, a unit wishing to communicate requests a bus cycle and when the bus cycle is granted, the unit beomes the "master" and is able to address any other unit in the system as the "slave". In the cases of those bus exchanges which require a response (e.g. memory read operation), the requesting unit as "master" identifies itself and indicates to the "slave" unit that a reponse is required. When the slave is ready to respond (e.g. obtains the information requested), it assumes the role of "master" and initiates the transfer of information to the requesting unit. Thus, the number of bus cycles vary depending upon the type of operation being performed. By altering the states of the signals applied to the control lines as discussed in connection with FIG. 2, a unit is able to designate to the other unit, the type of cycle or operation being initiated or performed.

A distributed tie-breaking network associated with each unit grants bus cycles and resolves simultaneous requests for use of bus 10. Priority is granted on the basis of physical position on bus 10, the highest priority being given to the first unit on the bus. In the present system, the memory subsystem is granted the highest priority and the CPU is granted the lowest priority with the other units being positioned on the basis of their performance requirements.

MEMORY SUBSYSTEM INTERFACE

Before describing the controller of FIG. 1, it is seen that there are a number of lines which constitute the interface between the controller and a bus. As shown, the interface lines include a number of address lines (BSAD00-23, BSAP00), two sets of data lines (BSDT00-15, BSDP00, BSDP08) and (BSDT16-31, BSDP16, BSDP24), a number of control lines (BSMREF-BSMCLR), a number of timing lines (BSREQT-BSNAKR), and a number of tie breaking network lines (BSAUOK-BSIUOK, BSMYOK).

The description of the above interface lines are given in greater detail in the section to follow.

| MEMORY SUBSYSTEM INTERFACE LINES | |
|---|---|
| Designation | Description |
| | Address Lines |
| BSAD00-BSAD23 | The bus address lines constitue a twenty-four bit wide path used in conjuction with the bus memory reference line BSMREF to transfer a 24-bit address to controller 200 or a 16-bit identifier from controller 200 to the bus (for receipt by a slave unit). When used for memory addressing, the signals applied to lines BSAD00-BSAD03 select a particular 512K word module, the signals applied to lines BSAD04-BSAD22 select one of the 512K words in the module while the signal applied to line BSAD23 selects one of the bytes within the selected word (i.e., BSAD23 = 1 = right byte; BSAD23 = 0 = left byte). When used for identification, lines BSAD00-BSAD07 are not used. The lines BSAD08-BSAD23 carry the indentification of the receiving unit as transmitted to controller 200 during the previous memory read request. |
| BSAP00 | The bus address parity line is a bidirectional line which provides an odd parity signal for the address signals applied to lines BSAD00-BSAD07. |
| | Data Lines |
| BSDT00-BSDT15, BSDT16-BSDT31 | The sets of bus data lines constitute a 32-bit or two word wide bidirectional path for transferring data or identification information between controller 200 and the bus as a function of the cycle of operation being performed. During a write cycle of operation, the bus data lines transfer information to be written into memory at the location specified by the address signals applied to lines BSAD00-BSAD23. During the first half of a read cycle of operation, the data lines BSDT00-BSDT15 transfer indentification information (channel number) to the controller 200. During the second half of the read cycle, the data lines transfer the information read from memory. |
| BSDP00, BSDP08, BSDP16, BSDP24 | The bus data parity lines are two sets of bidirectional lines which provide odd parity signals coded as follows: BSDP08=odd parity for signals applied to lines BSDT00-BSDT07 (left byte); BSDP08=odd parity for signals applied to lines BSDT08-BSDT15 (right byte); BSDP16=odd parity for signals applied to lines BSDT16-BBSDT23; and BSDP24=odd parity signals applied to lines BSDT24-BSDT31. |
| | Control Lines |
| BSMREF | The bus memory reference line extends from the bus to the memory controller 200. When set to a true state, this line signals the controller 200 that the lines BSAD00-BSAD23 contain a complete memory controller address and that it is performing a write or read operation upon the specified location. When reset to a false state, the line signals controller 200 that the lines BSAD00-BSAD23 contain information directed to another unit and not controller 200. |
| BSWRIT | The bus write line extends from the bus to the memory controller 200. This line when set to a true state, in conjunction with line BSMREF being true, signals controller 200 to perform a write cycle of operation. When reset to a false state, this line, in conjunction with line BSMREF being true, signals controller 200 to perform a read cycle of operation. |
| BSBYTE | The bus byte line extends from the bus to controller 200. This line, when set to a true state, signals controller 200 that it is to perform a byte operation rather than a word operation. |
| BSLOCK | the bus lock line extends from the bus to controller 200. When set to a true state, this line signals controller 200 of a request to perform a test or change the status of a memory lock flip-flop included within the controller 200. |
| BSSHBC | The bus second half bus cycle line is used to signal a unit that the current information applied to the bus by controller 200 is the information requested by a previous read request. In this case, both controller 200 and the unit receiving the information are busy to all units from the start of the initiation cycle until controller 200 completes the transfer. This line is used in conjunction with the BSLOCK line to set or reset its memory lock flip-flop. When a unit is requesting to read or write and line BSLOCK is true, the line BSSHBC, when true, signals controller 200 to reset its lock flip-flop. When in a false state, it signals controller 200 to test and set its lock flip-flop. |
| BSMCLR | The bus master clear line extends from the bus to controller 200. When this line is set to a true state, it causes the controller 200 to clear to zeros certain bus circuits within controller 200. |

-continued
MEMORY SUBSYSTEM INTERFACE LINES

| Designation | Description |
|---|---|
| BSDBWD | The double word line is a bidirectional line which extends from the controller 200 to bus 10. This line together with the BSDBPL line is used during read requests to indicate how many words of data and in what format are being provided by memory controller 200. During read response cycles from memory controller 200, the state of line BSDBWD indicates whether one or two words of data are being applied to bus 10. When line BSDBWD is forced to a binary ONE state, this indicates that two words are being transferred. When only one word is being transferred, line BSDBWD is forced to a binary ZERO. |
| BSDBPL | The double pull line is a bidirectional line which extends between controller 200 and bus 10. This line together with line BSDBWD indicates whether the response is the first (not the last) or the last unit of data requested. |

Bus Handshake/Timing Lines

| Designation | Description |
|---|---|
| BSREQT | The bus request line is a bidirectional line which extends between the bus and controller 200. When set to a true state, it signals the controller 200 that another unit requesting a bus cycle. When reset to a false state, it signals controller 200 that there is no bus pending bus request. This line is forced to a true state by controller 200 to request a read second half bus cycle. |
| BSDCNN | The data cycle line is a bidirectional line which extends between the bus and controller 200. When forced to a true state, the line signals the controller 200 that a unit was granted a requested bus cycle and placed information on the bus for another unit. The controller 200 forces the line to a true state to signal that it is transmitting requested data back to a unit. Prior to this, controller 200 had requested and been granted a bus cycle. |
| BSACKR | The bus acknowledge line is a bidirectional line which extends between the bus and controller 200. When set to a binary ONE by controller 200, the line signals that it is accepting a bus transfer during a read first half bus cycle or write cycle. During a read second half bus cycle, this line when set to a binary ONE by the unit which originated the request signals the controller 200 of its acceptance of a transfer. |
| BSWAIT | The bus wait line is a bidirectional line which extends between the bus and controller 200. When set to a true or binary ONE state by controller 200, it signals a requesting unit that the controller cannot accept a transfer at this time. Thereafter, the unit will initiate successive retries until the controller 200 acknowledges the transfer. The controller 200 sets the BSWAIT line true under the following conditions:<br>1. It is busy when all queue registers are full.<br>2. It is busy when placed in an initialize mode.<br>When the BSWAIT line is set to a true or binary ONE state by a unit, this signals the controller 200 that the data is not being accepted by the requesting unit and to terminate its present bus cycle of operation |
| BSNAKR | The bus negative acknowledge line is a bidirectional line which extends between the bus and controller 200. When this line is set to a true or binary ONE state by controller 200, it signals that it is refusing a specified transfer. The controller 200 sets line BSNAKR to a true state as follows:<br>1. Memory lock flip-flop is set to a binary ONE, and<br>2. The request is to test and set the lock flip-flop (BSLOCK true and BSSHBC false).<br>In all other cases, then the memory lock flip-flop is set, controller 200 generates a response via the BSACKR line or the BSWAIT line or generates no response. When the BSNAKR line is forced true by a unit, this signals controller 200 that the data is not accepted by the unit and to terminate its cycle of operation. |

Tie Breaking Control Lines

| Designation | Description |
|---|---|
| BSAUOK-BSIUOK | The tie breaking network lines extend from the bus to controller 200. These lines signal controller 200 whether units of higher priority have made bus requests. When all the signals on these lines are binary ONES, this signals controller 200 that it has been granted a bus cycle at which time it is able to force the BSDCNN line to a binary ONE. When any one of the signals on the lines is a binary ZERO, this signals controller 200 that it has not been granted a bus cycle and is inhibited from forcing line BSDONN to a binary ONE. |
| BSMYOK | The tie breaking network line extends from controller 200 to the bus. Controller 200 forces this line to a false or binary ZERO state to signal other units of lower priority of a bus request. |

GENERAL DESCRIPTION OF THE SYSTEM OF FIG. 3

Figure 3:
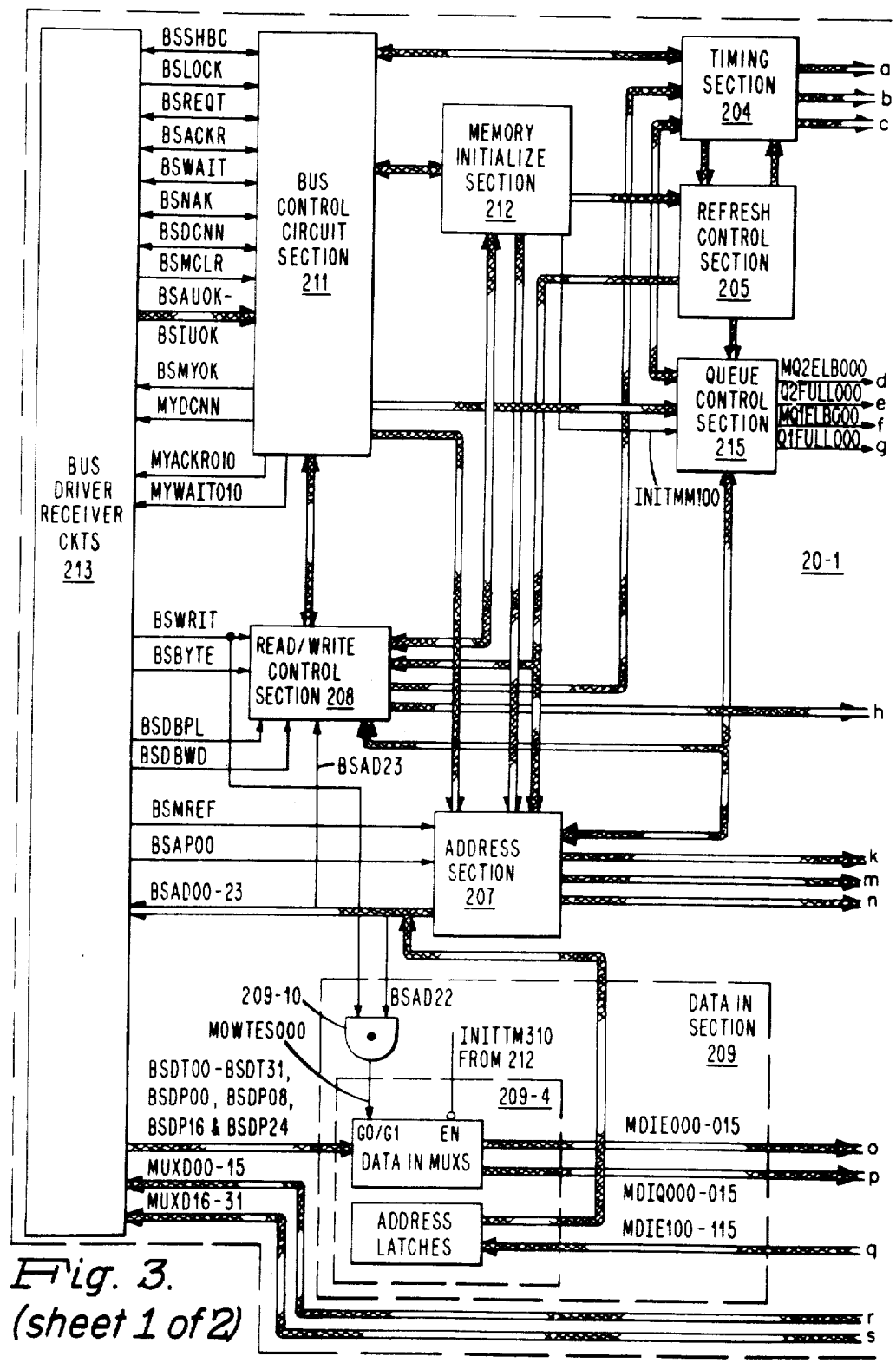
FIG. 3 shows in block diagram form the memory subsystem 20-1 of FIG. 1.

FIG. 3 shows a preferred embodiment of memory subsystem 20-1 including controller 200-1 which is constructed using the principles of the present invention Memory subsystem 20-2 is constructed in an identical manner. Referring to FIG. 3, it is seen that the controller 200 controls the two 256K word memory module units 210-2 and 210-4 of memory section 210. The module units of blocks 210-2 and 210-4 include high speed MOS random access memory integrated circuits corresponding to blocks 210-20 and 210-40, and address buffer circuits corresponding to blocks 210-22 through 210-26 and 210-42 through 210-46. Each 256K memory unit is constructed from 64K word by 1-bit dynamic MOS RAM chips. More specifically, each 256K by 22-bit memory module includes 88, 65,534 (64K) word by 1-bit chips. Within each chip there are a number of storage arrays organized in a matrix of 256 rows by 256 columns of storage cells.

The controller 200-1 includes those circuits required to generate memory timing signals, perform refresh operations, rewrite control operations, data transfer operations, address distribution and decoding operations and bus interface operations. Such circuits are included as part of the different sections of FIG. 3.

The sections include a timing section 204, a refresh control section 205, a queue control section 215, a data control section 206, an address section 207, a read/write control section 208, a data-in section 209, a bus control circuit section 211, a memory initialize circuit section 212, and bus driver/receiver circuit section 213.

The bus control section 211, in addition to including the apparatus of the present invention, includes the logic circuits which generate signals for generating and accepting bus cycle requests for single and double word operations. As seen from FIG. 3, these circuits as well as the circuits of the other sections are connected to a bus via the driver/receiver circuits of section 213 which were conventional in design. The section 211 includes the tie breaking network circuits which resolve requests priority on the basis of a unit's physical position on the bus. The memory controller, located at the left most or bottom position of the bus, is assigned the highest priority while a central processing unit (CPU), located at the right most or top position of the bus is assigned the lowest priority. For further information regarding bus operation, reference may be made to U.S. Pat. No. 4,000,485 which issued Dec. 28, 1976.

The timing section 204 includes timing generator circuits which generate the required sequence of timing signals for memory read and write cycles of operation. As seen from FIG. 3, this section transmits and receives signals to and from sections 205, 206, 207, 208, 211 and 215.

Figure 4:
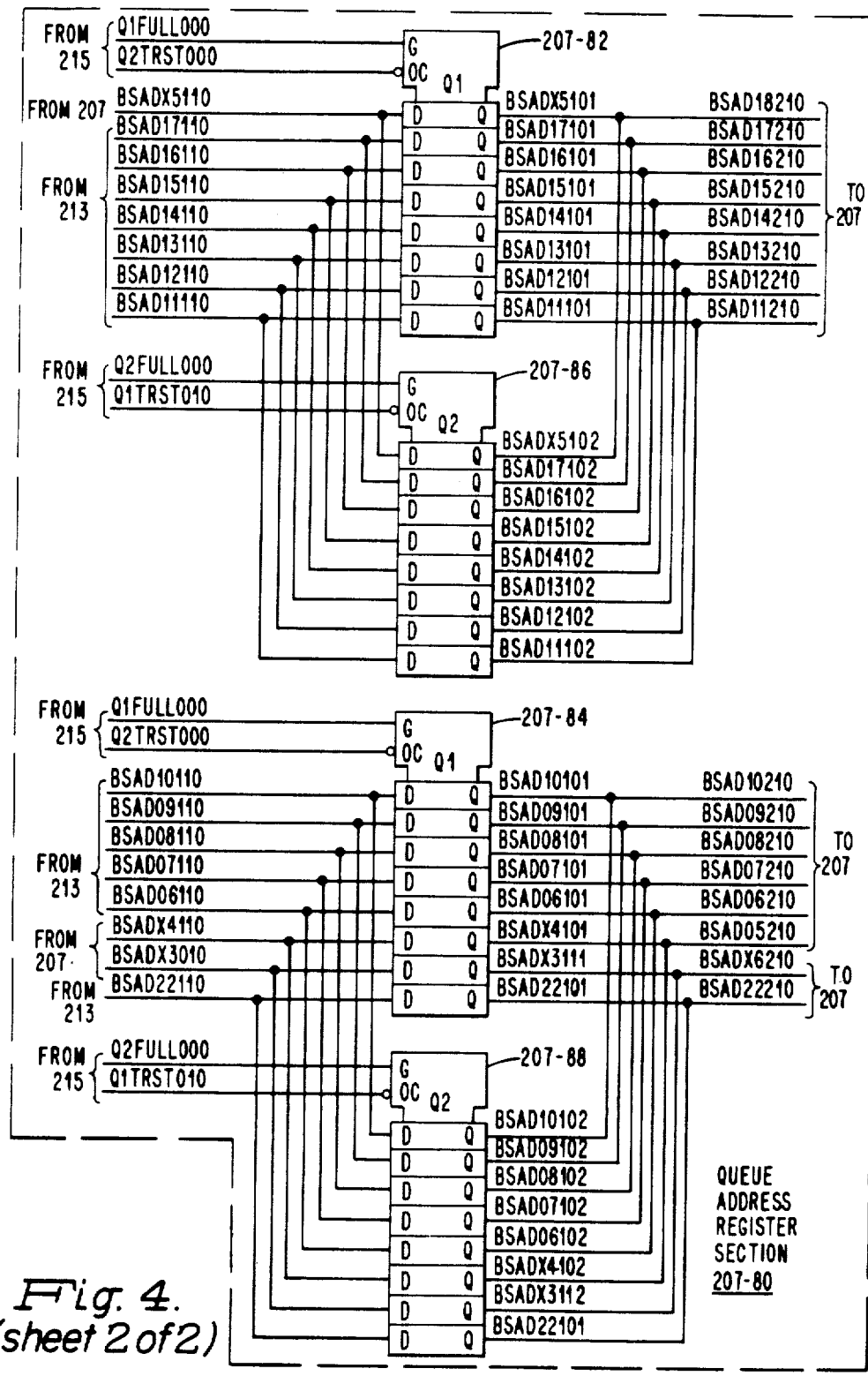

The address section 207, shown in greater detail in FIG. 4, includes circuits which decode, generate and distribute address signals required for refresh operations, initialization and read/write selection. The section 207 receives address signals from lines BSAD08-BSAD23 and address lines BSAD00-BSAD07 and BSAP00 in addition to the memory reference control signal from the BSMREF line. Additionally, section 207 receives control and timing signals from sections 204, 212 and 205.

The memory initialization section 212 includes circuits, conventional in design, for clearing the memory controller circuits to an initial or predetermined state.

The read/write control section 208 includes register and control logic circuits, conventional in design. The register circuits receive and store signals corresponding to the states of the BSWRIT, BSBYTE, BSDBPL, BSDBWD and BSAD23 lines in addition to boundary signal BOUNDY110 from section 207. The control circuits decode the signals from the register circuits and generate signals which are applied to sections 204, 207 and 210 for establishing whether the controller is to perform the read, write or read followed by a write cycle of operation (i.e., for a byte command).

The refresh section 205 includes the circuits for periodically refreshing the contents of the memory. Section 205 receives timing and control signals from section 204 and provides refresh command control signals to sections 204, 207, 208 and 212. For further details, reference may be made to U.S. Pat. No. 4,185,323 which discloses circuits for generating refresh command (REFCOM) signals.

The data in section 209 includes circuits of block 209-4 containing a pair of multiplexer circuits and an address register which is connected to receive signals from section 206. The multiplexer circuits, conventional in design, receive data words from the two sets of bus lines BSDT00-15 and BSDT16-31 and apply the appropriate words via the sets of output lines MDIE000-015 and MDIO000-015 to the correct memory modules during a write cycle of operation. That is, multiplexer circuits are selectively enabled by signal MOWTES000 generated by an AND gate 209-10 when initialize signal INITTM310 from 212 is a binary ZERO (i.e., not in an initialize mode). The AND gate 209-10 generates signal MOWTES000 as a function of bus address bit 22 (i.e., signal BSAD22) and whether the memory subsystem is doing a write operation (i.e., signal BSWRIT). During a write operation, signal MOWTES000 selects the correct data word (i.e., the word applied to bus lines BSDT00-15 or BSDT16-31) to be applied to the correct memory unit. This enables a write operation to start on any word boundary.

During a read operation, the multiplexer circuits are conditioned to apply the module identification information received from the bus lines BSDT00-15 back to the address bus lines BSAD08-23. This is done by loading the signals applied to lines BSDT00-15 into the even data registers 206-8 of section 206. This, in turn, causes the address register latches of block 209-4 to be with the module identification information transmitted via the bus lines BSDT00-15. Since this is not pertinent to an understanding of the present invention, it will not be further discussed herein.

The data control section 206 includes two tristate operated data registers 206-8 and 206-10 and multiplexer circuits 206-16 and 206-18 with associated control circuits which enable data to be written into and/or read from the even and odd memory units 210-20 and 210-40 of section 210. For example, during a double wide read cycle operation, operand or instruction signals are read out from the units 210-20 and 210-40 into the even and odd output registers 206-8 and 206-10. During a write cycle of operation, the byte operand signals are loaded into the leftmost section of the pair of registers 206-8 and 206-10 from the bus via section 209-4 and written into the odd or even unit of section 210.

The controller 200 includes error detection and correction (EDAC) apparatus wherein each word contains 16 data bits and 6 check bits used to detect and correct single bit errors in the data words and detect and signal without correction, double bit errors in the data word. The EDAC apparatus includes two sets of EDAC encoder/decoder circuits 206-12 and 206-14. These circuits may take the form of those circuits disclosed in U.S. Pat. No. 4,072,853 which issued Feb. 7, 1978. Additionally, the section 206 enables a return of identification information received from the data lines BSDT00-15 and stored in register 209-4 via the address lines BSAD08-23.

The queue control section 215 includes circuits for storing address and control information for concurrently processing a plurality of memory requests. As seen from FIG. 3, section 215 receives control signals from sections 204, 205, 207, 211 and 212. The section provides control signals to sections 206, 207 and 208 as shown.

Pertinent portions of the above sections will now be discussed in greater detail with reference to FIGS. 4 through 8.

DETAILED DESCRIPTION OF CONTROLLER SECTIONS

Only those sections which are believed necessary to an understanding of the present invention are described herein. For further information regarding the remaining sections, reference may be made to the related patent application or to U.S. Pat. No. 4,185,323.

Data Section 206

The even and odd data registers 206-8 and 206-10 are tristate operated. More specifically, the registers are constructed from D-type transparent latch circuits such as those designated SN74S373 manufactured by Texas Instruments Incorporated. The register circuits are transparent meaning that while the signal applied to the G input terminal is a binary ONE, the signals at the Q output terminals follow the signals applied to the D input terminals. That is, where the signal applied to the G input terminal goes low, the signal at Q output terminal latches.

The output terminals of registers 206-8 and 206-10 are connected in common in a wired OR arrangement for enabling the multiplexing of the pair of data word signals. Such multiplexing is accomplished by controlling the states of the signals MQ2ELB000, MQ1ELB000, MDOTSC000, and MDRELB000 applied to the output control (OC) input terminals of the different sections of registers 206-8 and 206-10 shown in FIG. 3. This operation is independent of the latching action of the register flip-flops which takes place in response to the signals applied to the G input terminals.

When signal MDOTSC100 generated by the circuits 204 is a binary ZERO, the middle sections of registers 206-8 and 206-10 are enabled to apply their contents to their output terminals. During a write cycle, the circuits 204 force signal MDOTSC100 to a binary ONE. This produces the opposite result to that described. That is, signal MDOTSC100 inhibits the middle sections of registers 206-8 and 206-10 from applying their contents to their output terminals.

The left most sections of registers 206-8 and 206-10 are enabled to apply their contents to their output terminals when signal MDRELB000 is a binary ZERO. Signal MDRELB000 for the purposes of the present invention can be considered to be in a binary ONE state. Thus, the right most sections of the registers are inhibited from applying their contents to their output terminals.

The left two most sections of registers 206-8 and 206-10 are controlled by the states of signals MQ1ELB000 and MQ2ELB000 which are generated by section 215. Signal MDOTSC000 when a binary ZERO enables one of the two left most sections of either register 206-8 or 206-10 as a function of the states of signals Q1TRST010 and Q2TRST000 from section 215. When signal Q1TRST010 is a binary ONE, signal Q2TRST000 is a binary ZERO and section 215 forces signal MQ1ELB000 to a binary ZERO. This enables the Q1 section of registers 206-8 and 206-10 to apply their contents to their output terminals. Conversely, when signal Q1TRST010 is a binary ZERO, signal Q2TRST000 is a binary ONE and section 215 forces signal MQ1ELB000 to a binary ZERO. This enables the Q2 sections of registers 206-8 and 206-10 to apply their contents to their output terminals.

Address Section 207

FIG. 4 illustrates in greater detail, the queue section 207-7. For further information regarding the other sections of section 207, reference may be made to the co-pending related patent application of Robert B. Johnson and Chester M. Nibby, Jr. discussed in the introductory portion of this application.

Queue Section 207-7

As seen from FIG. 4, the section 207-7 includes a queue address/counter section 207-70 and queue address register section 207-80. The section 207-70 includes a pair of 4-bit binary counters 207-72 and 207-74 whose outputs connect to a two input multiplexer circuit 207-76. The counters are constructed from conventional chips such as 74193 manufactured by Texas Instruments Corporation while the multiplexer is constructed from a 74S157 chip. As shown, each of the counter circuits 207-72 and 207-74 are connected to receive a portion of memory address bits (i.e., BSAD19, BSAD20 and BSAD21) of a memory command address of a memory read request which define the starting pair of locations of the first word pair to be transferred to the requesting unit by memory controller 200. Each of the counters 207-72 and 207-74 are loaded with new address information in response to a signal from queue control section 215 indicating that the queue address section associated therewith is not full (i.e., a counter is loaded when either signal Q1FULL010 or Q2FULL010 is a binary ZERO).

When controller 200-1 is conditioned to operate in a burst mode, each counter is incremented by one in response to a signal (i.e., signal UPCNQ1000 or UPCNQ2000) from section 215 upon completion of the transfer of a word pair to bus 10 from the center right sections of data registers 206-8 and 206-10.

When one of the counters 207-72 or 207-74 has been incremented to a maximum count of 8 indicative of completion of burst command, execution of the memory controller 200-1, the counter forces a carry output signal (signal BMOLQ1000 or BMOLQ2000) to a binary ZERO which is used to reset a burst command mode flip-flop of section 215 to a binary ZERO.

The outputs of the counters 207-72 and 207-74 are applied to different input terminals of multiplexer circuit 207-76. The circuit 207-76 in accordance with the state of signal Q2TRST000 applies the appropriate set of address signals to another section of 207, not shown. More specifically, when signal Q2TRST000 is a binary ZERO, the multiplexer 207-76 selects as an address source, the queue counter 207-72. When signal Q2TRST000 is a binary ONE, the multiplexer selects queue counter 207-74 as the address source.

The queue address register section 207-80 as shown in FIG. 4 receives the bus address signals BSAD06110 through BSAD17110 and BSAD22110 are applied via the receiver circuits of block 213 of FIG. 3 as inputs to different stages of queue 1 address registers 207-82 and 207-84 and queue 2 address registers 207-86 and 207-88. Additionally, queue 1 address register 207-84 and queue 2 address registers 207-88 receive signals BSADX3110, BSADX4110 and BSADX5110 from another part of section 207, not shown. As explained herein, bus address signal BSADX3110 corresponds to signal BSAD04110 in the case of interleaved mode and signal BSAD03110 for banked mode. Bus address signal BSADX4410 corresponds to signal BSAD05110 (interleaved) and BSAD04110 (banked). Lastly, bus address signal BSADX5110 corresponds to signal BSAD18110 (interleaved) and signal BSAD05110 (banked).

The enabling gate input terminals of registers 207-82 and 207-84 are connected to receive queue 1 signal Q1FULL000 from section 215. The enabling gate input terminals of registers 207-86 and 207-88 are connected to receive queue 2 signal Q2FULL000 from section 215. The OC input terminals of registers 207-82 and 207-84 are connected to receive signal Q2TRST000 while the OC input terminals of registers 207-86 and 207-88 are connected to receive signal Q1TRST010.

Each of the registers 207-82 through 207-88 are constructed from D-type transparent latch circuits such as those designated as SN74S373 previously discussed. As seen from FIG. 4, the different address output terminals of the registers 207-82 and 207-86 and 207-84 and 207-88 are connected in common in a wired OR arrangement for enabling the interleaving of memory request addresses. Such interleaving is accomplished by controlling the states of the signals applied to the output control (OC) input terminals and the gate or clocking (G) input terminals of the registers 207-82 through 207-88. The output control (OC) terminals enable so-called tristate operation. That is, when either signal Q2TRST000 or signal Q1TRST010 is in a binary ONE state, this inhibits any memory request address sicnals from being applied to the Q output terminals of that register.

Read/Write Control Section 208

Figure 5:
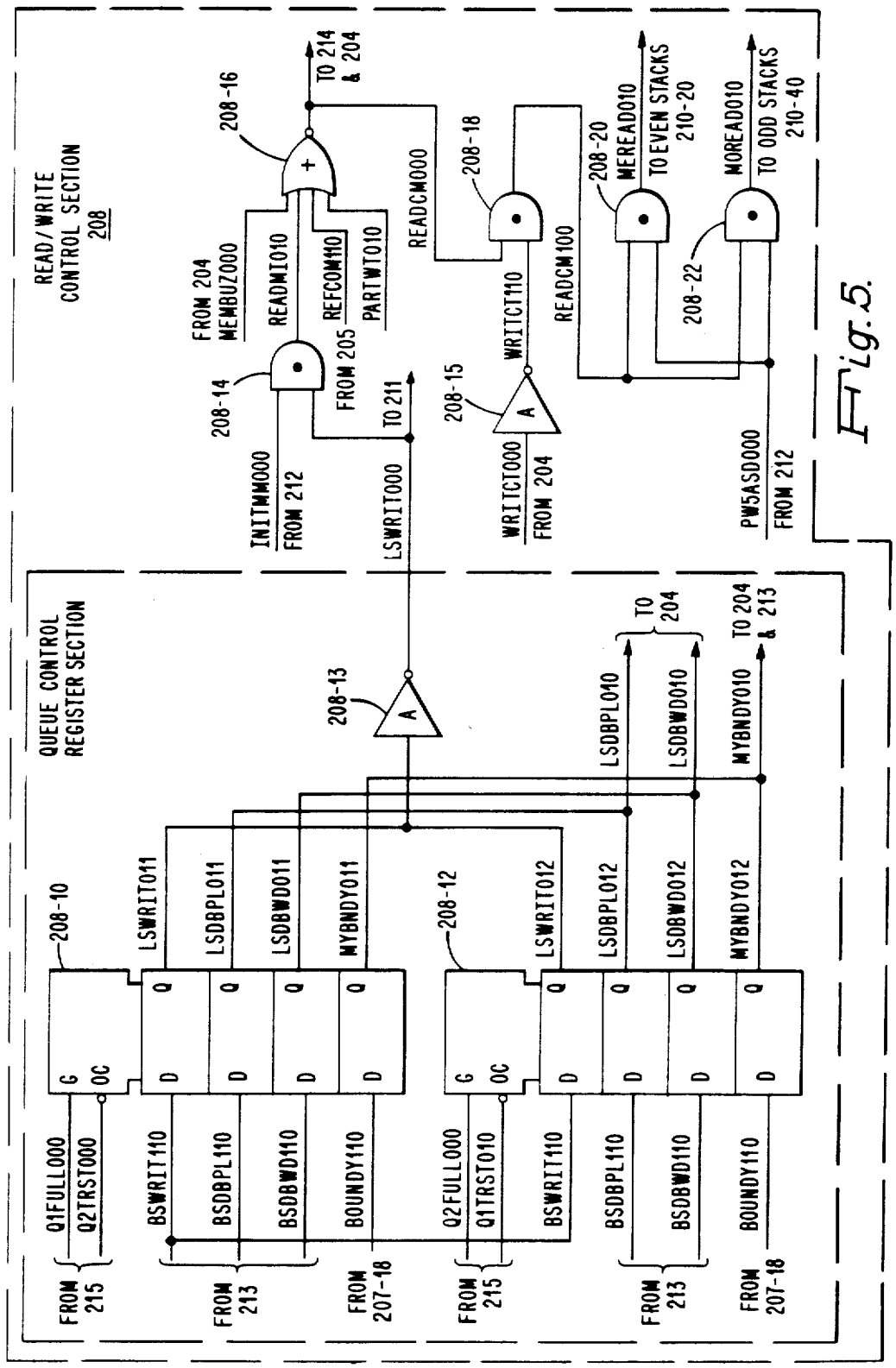

A portion of the circuits of section 208 is shown in greater detail in FIG. 5. As shown, the section 208 includes a pair of registers 208-10 and 208-12 in addition to circuits 208-13 through 208-22. Each of the registers 208-10 and 208-12 is constructed from D-type transparent latch circuits designated as SN74S373 and store signals BSWRIT110, BSDBPL110, BSDBWD110 and BOUNDY110. The signal BSWRIT110 is representative of a read/write command while signals BSDBPL110 and BSDBWB110 define different modes of operation for controller 200 (e.g. burst mode, double wide mode). These signals are latched in registers 208-10 and 208-12 when signal Q1FULL000 or Q2FULL000 from section 215 switches to a binary ONE. As seen from FIG. 5, the output terminals of registers 208-10 and 208-12 are connected in common in a wired OR arrangement, enabling the multiplexing or interleaving of memory commands. The signals Q1TRST010 and Q2TRST000 enable the tristate operation of registers 208-10 and 208-12 as discussed relative to section 207-80.

The write mode signal LSWRIT010 is applied to section 211. A read mode signal LSWRIT000 is generated by an inverter circuit 208-13 and applied to an AND gate 208-14 which also receives an initialize signal INITMM000 from section 212.

The AND gate 208-14 in response to a read command (i.e., signal LSWRIT000 is a binary ONE) when the system is not being initialized forces signal READ-MI010 to a binary ONE. When signal READMI010 is a binary ONE, this causes a NOR gate 208-16 to force a read command signal READCM000 to a binary ZERO. An AND gate 208-18 in response to signal READCM000 forces signal READCM100 to a binary ZERO. A pair of AND gates 208-20 and 208-22 force signals MEREAD010 and MOREAD010 to binary ZEROS. These signals are applied to the read/write control lines of the even and odd stack units 210-20 and 210-40. However, the signals are inverted by circuits included with units 210-20 and 210-40 before being applied to the chips which comprise such units.

Another one of the input signals to NOR gate 208-16 is partial write signal PARTWT010. As discussed in U.S. Pat. No. 4,185,323, there are certain types of memory operations such as byte write and initialize operations which require two cycles of operation. As mentioned, in the case of an initialize operation, signal INITMM000 is forced to a binary ZERO. This is effective to override the command applied to the bus. The read/write command signals MEREAD010 and MO-READ010 applied to the stack units 210-20 and 210-40 are generated as a function of signal PARTWT010. Signal PARTWT010 when forced to a binary ONE remains a binary ONE until the end of the first cycle and initiates a second cycle operation during which another set of timing signals identical to the first are generated by the circuits of section 204. During the first cycle, the read/write command signals are forced to binary ZEROS and during the second cycle, the signals are forced to binary ONES.

The other signals MEMBUZ000 and REFCOM110 applied to NOR gate 208-16 are forced to binary ONES prior to the state of a memory cycle of operation and during a refresh cycle respectively. It will be noted from FIG. 5 that during a write cycle of operation when signal WRITCT000 is forced to a binary ZERO by the circuits of section 204, signal WRITCT110 generated by an inverter circuit 208-15 causes AND gate 208-18 to switch signal READCM100 to a binary ONE. This in turn causes AND gates 208-20 and 208-22 to force signals MEREAD010 and MOREAD010 to binary ONES indicating that the stack units 210-20 and 210-40 are to perform a write cycle of operation. At this time, a power on signal PW5ASD000 from section 212 is normally a binary ONE.

Queue Control Section 215

As seen from FIG. 6, section 215 includes the number of queue logic circuits of block 215-1 and the number of burst mode logic circuits of block 215-6.

Section 215-1

The circuits of block 215-1 include a Q1 full flip-flop 215-10 having an input AND gate 215-12 and an output inverter circuit 215-14, an arbitrator flip-flop 215-18 having an inverter circuit 215-20, a NAND gate 215-22 and an AND gate 215-24 and a Q2 full flip-flop 215-26 having input NAND gate 215-28 and AND gate 215-30.

Additionally, section 215-1 includes a Q1, Q2 tristate control flip-flop 215-32 having a plurality of input NAND gates 215-34, 215-36 and 215-38 and an exclusive OR gate 215-40, a Q1 cycle flip-flop 215-45 having an input NAND gate 215-42 and a Q2 cycle flip-flop 215-44 having an input NAND gate 215-46 and an inverter circuit 215-43. Both the Q1 and Q2 cycle flip-flops 215-45 and 215-44 connect to an output AND gate 215-50. All flip-flops are constructed from D-type flip-flops such as those designated 74S74 manufactured by Texas Instruments Corporation.

The output signals generated by the Q1 full flip-flop 215-10 and Q2 full flip-flop 215-26 are used to clock address and data signals into different ones of the queue registers of sections 206, 207-7 and 208. The Q1 full and Q2 full flip-flops 215-10 and 215-26 are set to a binary ONE state when controller 200 accepts a memory request indicated by signal MYACKR010 being forced to a binary ONE. This occurs as a function of the state of arbitrator flip-flop 215-18. When the controller control logic circuits of section 215-1 are initialized, arbitrator flip-flop 215-18 is switched to a binary ONE via signal BSMCLR200. Signals Q1FULL000 and Q2FULL000 are forced to binary ONES in response to signal QRREST000 which is generated by signals BSMCLR200 and INITMM100. The first MYACKR100 signal switches the Q1 full flip-flop 215-10 from a binary ZERO to a binary ONE. From this point on, the Q1 full and Q2 full flip-flops 215-10 and 215-26 are enabled for alternate switching by signals ARBTQ1010 and ARBTQ2000 generated by arbitrator flip-flop 215-18. The Q1 and Q2 full flip-flops 215-10 and 215-26 switch on during the leading edge of signal MYACKR010 and switch state again upon the trailing edge of cycle signals Q1CYCL000 and Q2CYCL000. The arbitrator flip-flop 215-18 switches its state on the trailing edge of signal MYACKR010.

The above switching of Q1 and Q2 full flip-flops 215-10 and 215-16 assumes that the signals Q1BURS010 and Q2BURS010 applied to the D input terminals are binary ZEROS. Whenever signal Q1BURS010 or Q2BURS010 is a binary ONE indicating that the queue is processing a burst request, the queue flip-flop associated therewith is inhibited from resetting.

The state of Q1, Q2 tristate control flip-flop 215-32 indicates which queue is active (i.e., controls the outputs of the queue registers of sections 206, 207-7 and 208). It is initially set to a binary ONE state when signal QRREST000 is switched to a binary ZERO upon a change in state in signal Q1Q2CY000. This occurs when both cycle flip-flops 215-40 and 215-44 are switched to binary ZEROS via bus clear signal BSMCLR200. Thereafter, Q1, Q2 tristate control flip-flop 215-32 switches state as an exclusive OR logic function of signals Q2INVT010 and Q2TRST000 at the end of a Q1 or Q2 cycle defined by signal Q1Q2CY000. Signal Q2INVT010 when switched to a binary ONE causes flip-flop 215-32 to remain in a binary ONE only when signal Q2TRST000 is a binary ZERO. However, if signal Q2TRST000 is a binary ONE, flip-flop 215-32 remains in a binary ZERO state. Signal Q2INVT010 is forced to a binary ONE state whenever one of the queues is operating in a burst mode while the other queue is empty.

The states of the Q1 and Q2 cycle flip-flops 215-45 and 215-44 indicate when a particular queue is active (i.e., performing a memory cycle of operation). The setting of these flip-flops occurs as a result of two functions. One is the state or activity of the Q1 and Q2 full signals and the states of the Q1, Q2 tristate signals. When signal Q1TRST010 is a binary ONE indicating that queue 1 is active, signal MPULSE010, generated at the start of the delay line timing circuits 204, switches the Q1 cycle flip-flop 215-45 to a binary ONE at the leading edge of memory busy signal MEMBUZ000. The Q1 cycle flip-flop 215-45 is reset to a binary ZERO at the trailing edge of signal MEMBUZ000. As explained herein, the memory busy signal MEMBUZ000 is generated as a function of the input signals to the delay line circuits 204 and the bus signals, in particular, signal MYDCNN000. Accordingly, once a queue memory cycle of operation is started, it is terminated by a fixed timing pulse in the case of a memory write cycle or it is terminated at the trailing edge of the signal MYDCNN000 in the case of a memory read cycle.

If neither queue is operating in a burst mode, NAND gate 215-38 forces signal Q2INVT010 to a binary ZERO. Signal Q2INVT010 when a binary ZERO causes Q1, Q2 tristate control flip-flop 215-32 to alternate states at the end of an active cycle.

The Q2 cycle flip-flop 215-44 is set and reset in a similar fashion. The positive going edge of signal Q1CYCL000 or signal Q2CYCL000 indicates the end of a queue 1 cycle or Q2 cycle respectively. These signals are used to reset the Q1 full and Q2 full flip-flops 215-10 and 215-26, to condition the delay line restart circuits 204 causing the delay line timing circuits to start another cycle of operation, and to update the state of Q1, Q2 tristate control flip-flop 215-32 via signal Q1Q2CY000. As seen from FIG. 6, signal CYCINH000 inhibits the switching of the Q1 and Q2 cycle flip-flops 215-45 and 215-44 during refresh commands (i.e., when signal REFCOM110 is a binary ONE).

Section 215-6

Section 215-6 receives Q1 and Q2 cycle signals Q1CYCL010 and Q2CYCL010 in addition to signals Q1FULL010 and Q2FULL010. As shown, section 215-6 includes a Q1 burst mode flip-flop 215-60, a Q2 burst mode flip-flop 215-62 and an MYDCNN storage indicator flip-flop 215-83.

The Q1 burst mode flip-flop 215-60 includes a plurality of input AND gates 215-61 through 215-64, a plurality of inverter circuits 215-65 through 215-68 and NOR gates 215-69 and 215-79. These circuits are connected to force burst mode signal BURSCM110 to a binary ONE upon detection of receipt of a burst command from the bus (i.e., signal BSDBPL100 is a binary ZERO and signal BSDBWD110 is a binary ONE) when the memory command specifies a read operation (i.e., signal BSWRIT200 is a binary ONE) and includes an even or double word address (i.e., signal BSAD22200 is a binary ONE). This switches flip-flop 215-60 to a binary ONE when Q1 becomes full (i.e., Q1 full signal Q1FULL010 switches from a binary ZERO to a binary ONE).

When any one of the signals BSMCLR310, BMOLQ1010 or NAKRQ21010 is forced to a binary ONE, NOR gate 215-69 resets Q1 burst mode flip-flop 215-60 to a binary ZERO by forcing signal RESQ1B000 to a binary ZERO. Signal NAKRQ1010 is forced to a binary ONE by AND gate 215-64 in response to a negative acknowledgement (i.e., signal BSNAKR010 is a binary ONE) during a Q1 cycle (i.e., signal Q1CYCL010 is a binary ONE) upon the occurrence of bus signal MYDCNN210 from section 211. Signal BMOLQ1010 is forced to a binary ONE upon receipt of a counter carry out signal BMOLQ1000 from section 207-70.

The Q2 burst mode flip-flop 215-62 receives burst mode signal BURSCM110 from AND gate 215-63 and a reset signal RESQ2B000 generated by an input NOR gate 215-79, an AND gate 215-74 and an inverter circuit 216-78. As seen from FIG. 6, the Q2 burst mode flip-flop 215-62 is switched to a binary ONE in response to signal BURSCM110 when Q2 full signal Q2FULL010 switches from a binary ZERO to a binary ONE. It is reset to a binary ZERO when NOR gate 215-79 switches signal RESQ2B000 to a binary ZERO. This occurs in response to a carry out signal BMOLQ2000 from section 207-70, a negative acknowledgement signal NAKRQ2010 or a bus clear signal BSMCLR310.

The binary ONE outputs from the Q1 and Q2 burst mode flip-flops 215-60 and 215-62 in addition to being applied to section 215-1 are applied to output AND gates 215-80 and 215-82. The AND gate 215-80 generates Q1 up counter signal UPCNQ1000 during a burst mode operation (i.e., signal Q1BURS010 is a binary ONE) of a Q1 cycle (i.e., signal Q1CYCL010 is a binary ONE) in response to signal NEWDCNN210 from flip-flop 215-83. The flip-flop 215-83 switches output signal NEWDCNN210 to a binary ONE when the memory controller 200-1 transfers a pair of words to bus 10 as signalled by signal MYDCNN010 being switched to a binary ONE. The flip-flop 215-83 is cleared to a binary ZERO when memory busy signal MEMBUZ000 applied via an inverter circuit 215-85 switches to a binary ONE. This ensures that there is no false increment signal generated upon the occurrence of unusual conditions.

In a similar fashion, AND gate 215-82 generates Q2 up counter signal UPCNQ2000. These signals are applied to a corresponding one of the queue counters of section 207-70. The signals are also applied to an OR gate 215-84 for generation of a double wide response signal DWRESP110 which is applied to the line BSDBPL via a driver circuit of section 213. Signal DWRESP110 is forced to a binary ONE when the controller 200 is in a burst mode operation during a queue cycle of operation upon the generation of signal NEWDCNN210 by flip-flop 215-83 in response to bus response signal MYDCNN010 from the circuits of section 213. Signal DWRESP110 indicates whether or not additional responses (i.e., additional data transfers) are to follow when the controller 200-1 is operating in a burst mode.

Bus Control Section 211

FIG. 7 shows in greater detail, the bus control logic circuits of Section 211. As shown, this section, in accordance with the teachings of the present invention, includes the pause logic circuits of block 211-10 and a portion of the bus control logic circuits of block 211-100.

Pause Logic Circuits 211-10

As seen from FIG. 7, the pause logic circuits 211-10 include a pair of exclusive OR circuits 211-12 and 211-14, a NAND gate 211-16, a pair of NOR gates 211-18 and 211-20 and a pair of D-type flip-flops 211-22 and 211-24. The exclusive OR gate 211-12 receives queue full status signals Q1FULL010 and Q2FULL010 from section 215-1. When gate 211-12 detects that one of the queue circuits is empty, it forces signal Q1Q2FU010 to a binary ONE. The exclusive OR gate 211-14 receives queue burst mode signals Q1BURS010 and Q2BURS010 from section 215-6. When gate 211-14 detects that one of the queue circuits is processing a burst command, it forces signal Q1Q2BU010 to a binary ONE.

The NAND gate 211-16 forces signal Q1O2BU000 to a binary ZERO when signals Q1Q2FU010 and Q1Q2BU010 are binary ONES. When a binary ZERO, signal Q102BU000 causes NOR gate 211-18 to force signal MYREQC010 to a binary ONE provided that the remaining signals MEMBUZ000 through MYREQT010 are binary ZEROS. That is, when the memory is busy (i.e., signal MEMBUZ000 is a binary ZERO), there is no request stored (i.e., signal STREQQ010 is a binary ZERO), there is no refresh type operation taking place (i.e., ALPHUC010 is a binary ZERO) and there is no bus request being generated by the memory (i.e., signal MYREQT010 is a binary ZERO), signal Q102BU000 causes NOR gate 211-18 to force signal MYREQC010 to a binary ONE.

As soon as bus response signal BSDCNN110 applied to the clocking (c) input terminal of flip-flop 211-22 switches to a binary ONE, flip-flop 211-22 switches state as a function of the state of signal MYREQC010. Flip-flop 211-22 is cleared to a binary ZERO state when signal NOPAUS000 is forced to a binary ZERO. Signal PAUTRF000 is applied as an input to the bus control circuits of section 211-100.

As seen from FIG. 7, signal NOPAUS000 is generated by flip-flop 211-24. This flip-flop monitors the activity on bus 10 through the states of signals BSREQT110 and BSREQL110. As indicated previously, bus request signal BSREQT110 is forced to a binary ONE when a unit requests a bus cycle of operation. The bus request signal BSREQL110 is used in certain bus network priority arrangements for signalling requests for bus cycles when a group of low priority high speed units are connected to bus 10. For the purpose of the present invention, this signal can be considered the equivalent of signal BSREQT110.

When there are no units requesting a bus cycle (i.e., both signals BSREQT110 and BSREQL110 are binary ZEROS), NOR gate 211-20 forces signal BSREQED000 to a binary ONE. When signal MYSTBB000 from section 211-100 switches to a binary ONE at the end of the data cycle (i.e., 60 nanoseconds after the trailing edge of bus response signal BSDCNN010), this causes flip-flop 211-24 to switch to a binary ONE. At that time, signal NOPAUS000 is forced to a binary ZERO which causes pause flip-flop 211-22 to be switched to a binary ZERO.

However, when there is a unit requesting a bus cycle (i.e., either signal BSREQT110 or signal BSREQL110 is a binary ONE), NOR gate 211-20 forces signal BSREQED000 to a binary ZERO. When bus response signal MYSTBB000 switches to a binary ONE, this causes flip-flop 211-24 to switch to a binary ZERO. At that time, signal NOPAUS000 is forced to a binary ONE which permits pause flip-flop 211-22 to switch state as a function of signal MYREQC010. That is, when a queue is full and a bus request is received (i.e., signal Q1Q2FU010 is a binary ZERO), signal MYREQC010 is a binary ZERO. Accordingly, pause flip-flop 211-22 remains in a binary ZERO state. In the case where the queue is empty and a bus request is received (i.e., signal Q1Q2FU010 is a binary ONE), signal MYREQC010 is a binary ZERO. Accordingly, pause flip-flop 211-22 switches to a binary ONE state.

As seen from FIG. 7, when flip-flop 211-24 switches to a binary ZERO, this forces the preset (PR) terminal of the flip-flop to a binary ZERO. This, in turn, causes flip-flop 211-24 to switch to a binary ONE which results in clearing pause flip-flop 211-22 to a binary ZERO. Flip-flop 211-24 is cleared to a binary ZERO state via its clear (CLR) terminal when flip-flop 211-22 forces signal PAUTRF010 to a binary ZERO.

Bus Control Circuits 211-100

These circuits generate the memory acknowledgement signal MYACKR010, memory wait response signal MYWAIT010, memory bus response signals MYDCNN010, MYDCNN000 and MYDCNN100 and memory request signal MYREQT010, all of which are applied to the bus via section 213.

Before describing these circuits, a brief explanation of the operation of the bus circuits of section 211 will be given. These circuits are described in detail in the previously referenced U.S. patent of John L. Curley, et al. In general, section 211 of memory controller 200-1, as other units which connect to bus 10, include a user flip-flop. The circuits provide an output to the user flip-flop, in addition to the bus line BSDBPL via the circuits of block 213.

When a timing signal from the timing generator circuits of section 204 switches from a binary ZERO to a binary ONE, the user flip-flop is switched to a binary ONE when the memory accepts a request and is not performing a refresh cycle. The stored request signal is applied to the input of a request flip-flop. When this flip-flop is switched to a binary ONE, its output is applied to the bus tie breaking network in addition to the bus driver/receiver circuits of block 213 whereupon it is inverted and is applied to bus line BSREQT. When line BSREQT is forced to a binary ZERO, it prevents any other stored requests of other units from setting their corresponding request flip-flops. Since the memory controller 200-1 has the highest priority, this results in the switching of a grant flip-flop to a binary ONE. This results in signal MYDCNN010 being switched to a binary ONE. The signal MYDCNN010 is inverted by the driver/receiver circuits of block 213 and is applied to line BSDCNN as signal BSDCNN100.

Now referring to FIG. 7 and considering section 211-100 in detail, it is seen that the bus control circuits include a storage request flip-flop 211-102 having associated input NOR gate 211-104 and NOR gate 211-106 circuits, a wait flip-flop 211-108 having an input NAND gate 211-114 and a pair of output NOR gates 211-116 and 211-118 and a pair of memory response flip-flops 211-120 and 211-122 having input circuits which include a 60 nanosecond delay circuit 211-124, a NOR circuit 211-126 and inverter circuit 211-128. Additionally, the section 211-100 includes a request flip-flop 211-130 having input circuits which include a pair of NAND gates 211-132 and 211-134, an AND gate 211-136 connected in series with a 20 nanosecond delay circuit 211-138 and NOR gate 211-140, a priority network including a NAND gate 211-142 connected in series with a 100 nanosecond delay circuit 211-144 and NAND gate 211-146 and a memory data cycle flip-flop 211-150 having an input NOR gate 211-152 and output inverter circuit 211-154. The D-type flip-flops 211-108 and 211-150 are constructed from 74S74 chip circuits while the D-type flip-flops 211-102 and 211-130 are constructed from 74F74 chip circuits. The D-type flip-flops 211-120 and 211-122 are constructed from 74S175 chip circuits.

The store request flip-flop 211-102 switches to a binary ONE in the absence of a refresh type cycle and when the controller 200 is not being initialized (i.e., when signals ALPCNT010 and INITMM010 are binary ZEROS) in response to a memory read request (i.e., signal LSWRIT010 is a binary ZERO). Switching occurs when timing signal DCNNGO010 from section 204 switches from a binary ZERO to a binary ONE. The flip-flop 211-102 is reset to a binary ZERO via NOR gate 211-106 upon the generation of memory bus response signal MYDCNN010 or bus clear signal BSMCLR310.

The wait flip-flop 211-108 is set to a binary ONE in response to a wait command signal WAITCM010 upon the occurrence of bus signal BSDCNN110. Wait command signal WAITCM010 is generated when both queues are full (i.e., signal QQFULL000 is a binary ZERO). Signal EITHFU000 can be assumed to be a binary ONE. The generation of bus signal MYDCNN000 resets wait flip-flop 211-108 to a binary ZERO.

The state of wait flip-flop 211-108 along with other functions (not shown) determines the type of response generated by controller 200-1. In the case of a wait condition, signal WAITXX010 inhibits memory acknowledge response flip-flop 211-120 from switching to a binary ZERO state while signal WAITXX000 switches memory wait response flip-flop 211-122 to a binary ONE state. Switching occurs 60 nanoseconds following the generation of bus response signal BSDCNN110. In the absence of a wait condition, signals WAITXX010 and WAITXX000 switch flip-flops 211-120 and 211-122 to a binary ONE and to a binary ZERO, respectively. Also, when controller 200-1 is addressed, section 207 forces address signal MYADG-0100 to a binary ZERO which switches flip-flop 211-120 to a binary ONE.

Both flip-flops 211-120 and 211-122 are reset to binary ZEROS following the generation of signals BSDCNN110 and DCNR60010 (i.e., when signal MYSTBB110 is a binary ZERO) on the trailing edge of bus response signal BSDCNN110.

The request flip-flop 211-130 in accordance with the teachings of the present invention is switched to a binary ONE when a request is stored (i.e., signal STREQQ010 is a binary ONE) as a function of signal PAUTRF000 generated by the pause circuits 211-10. More specifically, when signal PAUTRF000 is a binary ONE, NAND gate 211-132 forces signal MYREQS000 to a binary ZERO. The signal MYREQS000 applied to the preset (PR) terminal of flip-flop 211-130 causes it to switch to a binary ONE. Accordingly, the binary ONE request signal MYREQT010 is applied to the priority network gate 211-146 for resolution.

Flip-flop 211-130 is cleared to a binary ZERO state by NAND gate 211-134 forcing signal MYREQR000 to a binary ZERO. This occurs when there is no stored request (i.e., signal STREQQ000 is a binary ONE) and the bus is not busy (i.e., signal BSSBSY000 is a binary ONE). Signal BSSBSY000 is forced to a binary ONE following the generation of the controller's bus request (i.e., signal BSREQT110 is a binary ZERO).

Memory data cycle flip-flop 211-150 is switched to a binary ONE state when priority network NAND gate 211-146 forces signal DCNSET000 to a binary ZERO. This occurs when all of the signals applied to NAND gate 211-146 are binary ONES. The flip-flop 211-150 is cleared to a binary ZERO state when NOR gate 211-152 switches signal DCNRES000 to a binary ZERO. This occurs in response to the generation of bus acknowledge signal BSACKR110, bus wait signal BSWAIT110 or bus clear signal BSMCLR310.

Bus Circuits Section 213

Figure 8:
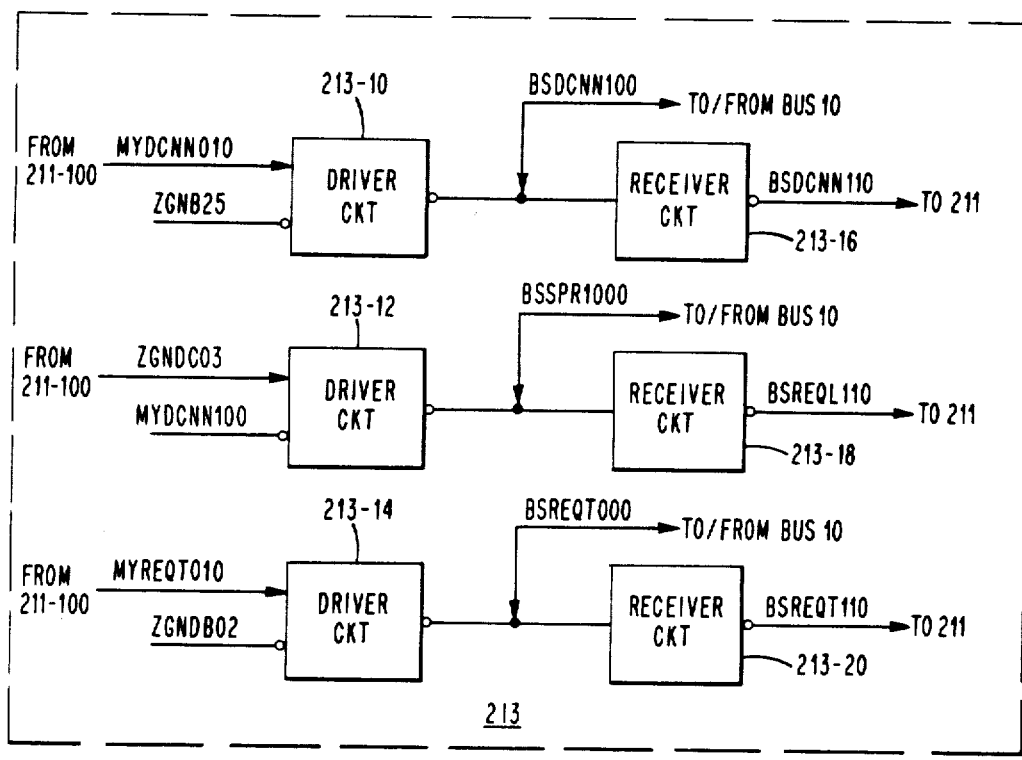

FIG. 8 illustrates in greater detail a portion of the driver and receiver circuits of block 213. These circuits generate the bus signals whose activity is monitored by the circuits of section 211-10 in accordance with the teachings of the present invention. As previously mentioned, the driver and receiver circuits are conventional in design.

As seen from FIG. 8, the driver circuits 213-10, 213-12 and 213-14 receive as data inputs, signals MYDCNN010, ZGNDC03 and MYREQT010, respectively, from section 211-100. The signals ZGNB25, MYDCNN100 and ZGNDB02 are applied to the control input terminals of driver circuits 213-10, 213-12 and 213-14, respectively.

The receiver circuits 213-16, 213-18 and 213-20 connect to bus lines BSDCNN, BSSPR1 and BSREQT, respectively. The receiver circuit 213 inverts and applies a corresponding one of the bus signals BSDCNN110, BSREQL110 and BSREQT110 to section 211.

DESCRIPTION OF OPERATION

With reference to FIGS. 1-9b and the timing diagrams of FIGS. 10a through 10d, the operation of the preferred embodiment of the present invention will now be described. FIG. 10a illustrates the general operation of controller 200-1 when receiving a memory request specifying a burst transfer followed by successive non-burst memory requests. For each request, CPU 40 operates to switch lines DSDBPL and BSDBWD to binary ONES indicating a double wide request and line BSWRIT to a binary ZERO.

Figure 9A:
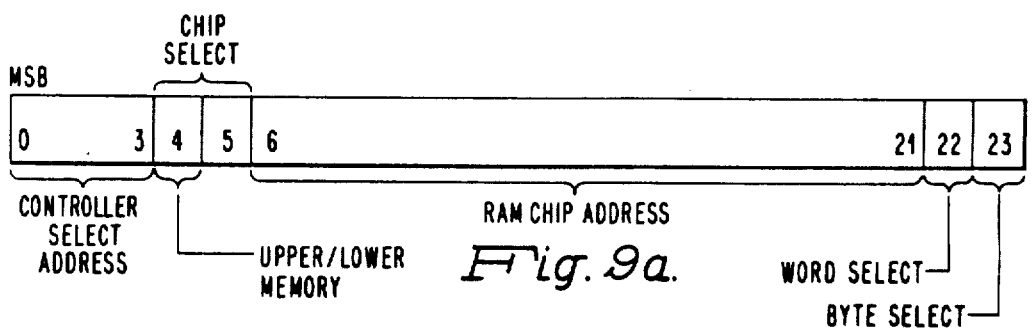
FIGS. 9a and 9b show the different formats of the address of a memory request applied to the memory subsystem 20-1 of FIG. 1.
Figure 9B:
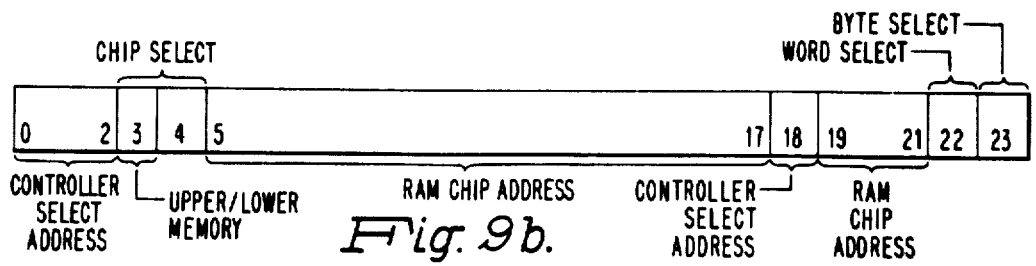
Figure 10A:
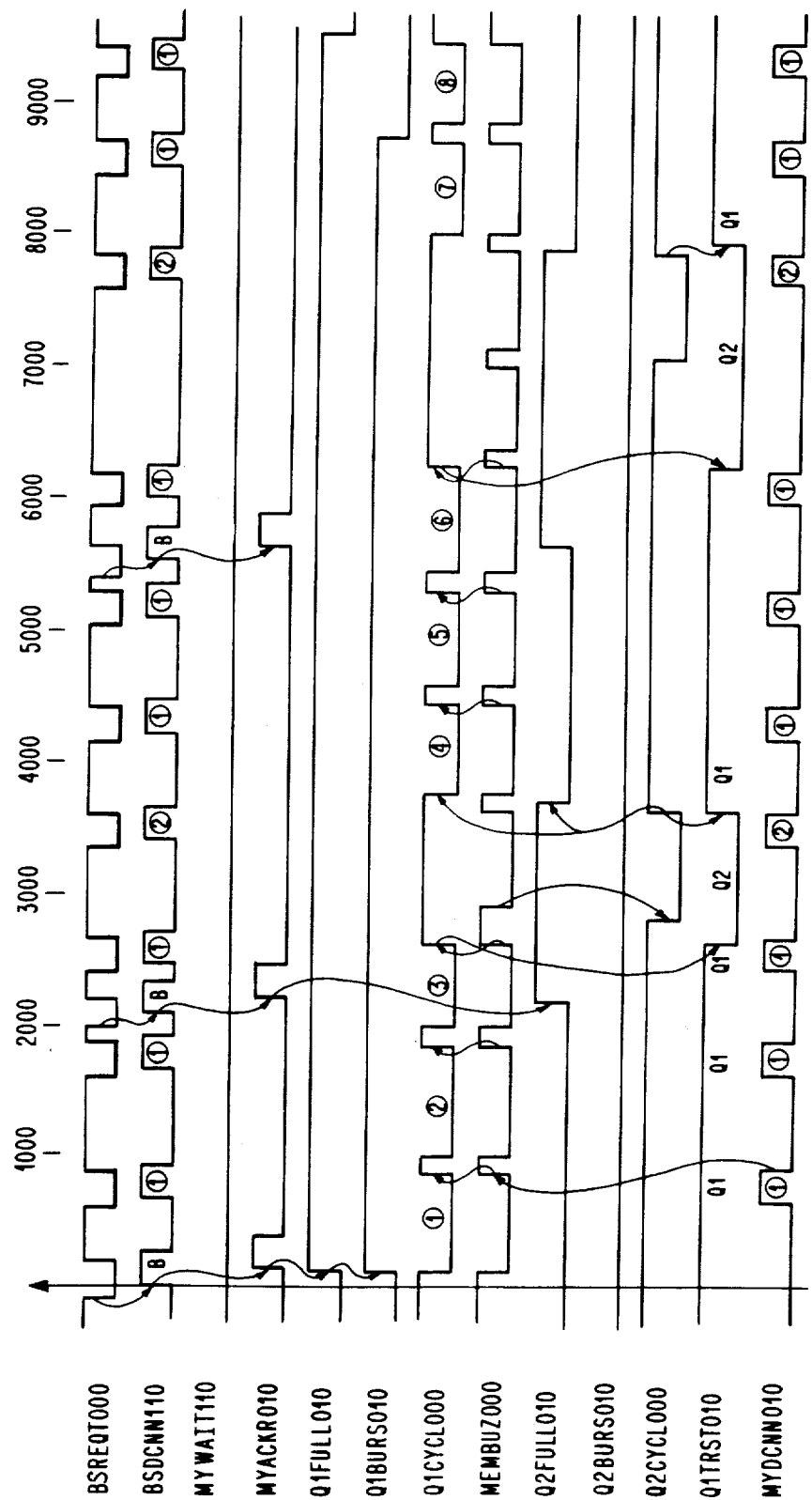
FIGS. 10a through 10d are timing diagrams used in describing the operation of the apparatus of the present invention.

Each memory read request includes as memory address having one of the formats shown in FIGS. 9a and 9b.

More specifically, FIG. 9a illustrates the format of the memory addresses applied to the controller as part of each memory read or write request when the system on FIG. 1 is being operated in banked mode. The four high order/most significant bit positions 0-3 are coded to identify which of the sixteen memory controllers is to process the request. Address bit 4 is used to select which 256K half (i.e., upper or lower half) of controller memory is being accessed. Also, bit 4 together with address bit 5 are coded to select which row of RAM chips are being addressed. As discussed herein, these bits are decoded and used to generate a row address strobe (RAS) signal which latches the 8-bit row addresses into the desired row of RAM chips within a pair of memory stacks. These address bits are processed by the circuits of each controller and are not provided to the RAM chips.

Address bits 6-21 specify the address of the 22-bit storage location within the RAM chips being addressed. These 16 address bits are multiplexed into 8 address inputs and applied via the address buffer circuits of blocks 210-26 and 210-46 to the address input terminals A0-A7 of the RAM chips of the memory units 210-20 and 210-40 of FIG. 3.

The least significant address bits 22 and 23 are coded to select which word and byte are being addressed.

FIG. 9b illustrates the format of the memory addresses when the system of FIG. 1 is being operated in interleaved mode. The differences as seen from the Figures are that the most significant bit positions 0-2 and bit 18 identify the controller which is to process the request. Address bit 3 is used to select which 256K half of controller memory is being accessed. Bits 3 and 4 select the row of RAM chips being addressed and address bits 5-21 excluding bit 18 specifying the location being addressed.

Controller Burst Mode Operation

Now, referring to FIG. 10a, in the case of the first request, it is assumed one of the disk controllers 50-1 through 50-4 of FIG. 1 switches line BSDBPL to a binary ZERO, line BSDBWD to a binary ONE and line BSWRIT to a binary ZERO indicating that the memory request is a burst command. Also, controller address bits BSAD0-2 and 18 are coded to specify controller 200-1. Address bits BSAD19-22 are assumed to be binary ZEROS. In the case of the second and third requests, it is assumed that CPU 40 or the disk controllers 50-1 through 50-4 switch line BSDBPL to a binary ONE, line BSDBWD to a binary ONE and line BSWRIT to a binary ZERO indicating that each memory request is a double wide (nonburst) memory read request.

Now, referring to FIG. 10a, it is seen that the first bus request (i.e., signal BSREQT000) causes the generation of bus signal BSDCNN110 by the requestor. Bus circuits 211 generate signal BSDCNN110 when the requestor has been granted access to bus 10. The controller will switch MYACKR flip-flop 211-120 of FIG. 7 to a binary ONE, 60 nanoseconds after the leading edge of the requestor generated bus signal BSDCNN110. Setting occurs because wait flip-flop 211-108 is in a binary ZERO state (i.e., both queues are not full-signal QQFULL000 is a binary ONE).

The switching of MYACKR flip-flop 211-120 to a binary ONE causes Q1 full flip-flop 215-10 of FIG. 6 to switch to a binary ONE on the positive going leading edge of signal MYACKR010. At this time, arbitrator flip-flop 215-18 is assumed to be in a binary ONE state. Such switching forces signal Q1FULL010 to a binary ONE which, in turn, causes Q1 burst mode flip-flop 215-60 to switch to a binary ONE. In greater detail, AND gate 215-63 is conditioned by the binary ONE states of signals BURSCM010, BSWRIT200 and BSAD222000 to force burst mode signal BURSCM110 to a binary ONE. This switches Q1 burst mode flip-flop 215-60 to a binary ONE on the positive going transition of signal Q1FULL010.

The Q1 full signal Q1FULL010 loads signals representative of memory address bits 19-21 of the first memory request into Q1 counter 207-72 of FIG. 4. The remaining address bits 22 and 5-17 are loaded into queue 1 address registers 207-82 and 207-84 of FIG. 4 together with the states of signals BSADX5110, BSADX4110 and BSADX3110. Additionally, Q1 full signal Q1FULL010 loads the states of bus control lines BSWRIT, BSDBPL and BSDBWD corresponding to signals BSWRIT110, BSDBPL110 and BSDBWD110 into the Q1 command control register 208-10 of FIG. 5. At this time, the state of boundary address signal BOUNDY110 from section 207 also is loaded into register 208-10. Since this signal is not involved in the processing of burst commands, it can be assumed to be a binary ONE.

The memory acknowledgement signal MYACKR110 also causes the circuits 204 to initiate a memory cycle of operation. This forces signal MEMBUZ000 to a binary ZERO as seen from FIG. 10a indicating that controller 200-1 has begun a memory cycle of operation (i.e., memory is busy). Also, timing signal MPULSE010 switches Q1 cycle flip-flop 215-45 to a binary ONE as a function of the state of signal Q1TRST010 which is a binary ONE. This specifies that the queue 1 circuits process the first memory request.

The queue address signals applied to the output terminals of Q1 address registers 207-82 and 207-84 of FIG. 4 in response to signal Q2TRST000 (i.e., complement of signal Q1TRST010 of FIG. 10a) are transferred to the RAM chips within stacks 210-20 and 210-40. Also, signals BSAD20210 and BSAD19210 from Q1 counter 207-72 are applied to multiplexer 207-76. Thereafter, these signals are decoded and transferred to the RAM chips within stacks 210-20 and 210-40.

The memory request stored in section 208 causes the contents of a first pair of storage locations to be read out from the specified addresses. That is, the signal BSWRIT110 causes the circuits 208 of FIG. 5 to force read command signal READCM100 to a binary ZERO. This results in AND gates 208-20 and 208-22 forcing signals MEREAD010 and MOREAD010 to binary ZEROS causing the specified rows of chips to perform a read operation. The pair of words are loaded into the middle right sections of data registers 206-8 and 206-10, in response to timing signals MDOECT010 and MDOOCT010 from section 204.

From there, the pair of words are transferring to bus 10 during the second half of the bus cycle designated by the first "1" portion of signal BSDCNN110 in FIG. 10a. This signal is switched to a binary ONE by the driver circuit 213-10 of sections 213 of FIG. 8 on the leading edge of signal MYDCNN010. This, in turn, forces line BSDCNN to a binary ONE state signalling the requestor of the transfer.

Also, signal MYDCNN010 switches flip-flop 215-83 to a binary ONE. This switches signal NEWDCNN210 to a binary ONE which causes AND gate 215-80 of FIG. 6 to force signal UPCNQ1000 to a binary ONE. This, in turn, forces double wide response signal DWRESP110 to a binary ONE. That is, at this time, both the Q1 burst mode flip-flop 215-60 and Q1 cycle flip-flop 215-45 are binary ONES. This response signal when applied to the circuits of block 213 forces line BSDBPL to a binary ONE to signal the memory requestor that more transfers of word pairs are to take place.

The signal UPCNQ1000 increments by one the first memory request address contents of Q1 address counter 207-72 enabling the read out of the next word pair. As seen from FIG. 10a, the first queue 1 memory cycle of operation is completed when the trailing edge of the first signal MYDCNN010 switches memory busy signal MEMBUZ000 to a binary ONE. Following that, signal BSDCNN110 switches to a binary ZERO in response to flip-flop 211-150 of FIG. 7 being switched to a binary ZERO denoting the end of the data cycle.

Signal MEMBUZ000 causes Q1 cycle flip-flop 215-45 to switch to a binary ZERO state. In response to such switching, AND gate 215-50 forces signal Q1Q2CY000 from a binary ZERO to a binary ONE. Hence, signal Q1Q2CY000 conforms to signal MEMBUZ000 but is delayed in time. At the positive going transition of signal Q1Q2CY000, Q1,Q2 tristate control flip-flop 215-32 is conditioned to switch state as a function of signal QPOINT010. Since signal QPOINT010 is a binary ONE (i.e., Q2 full flip-flop 215-26 is a binary ZERO), Q1,Q2 tristate control flip-flop 215-32 remains a binary ONE.

As seen from FIG. 10a, the queue 1 circuits perform a second memory cycle of operation which results in the transfer of the second word pair to bus 10.

Next, controller 200-1 receives a memory (nonburst) double wide read request. Since only the queue 1 circuits are busy, the second bus request (i.e., signal BSREQT000) causes the generation of requestor signal BSDCNN110 which also results in MYACKR flip-flop 211-120 being switched to a binary ONE. That is, signal QQFULL000 is still a binary ONE which maintains wait flip-flop 211-108 in a binary ZERO state. Accordingly, no wait signal is generated as indicated in FIG. 10a.

This time the switching of MYACKR flip-flop 211-120 causes the Q2 full flip-flop 215-26 to switch to a binary ONE. Since the second memory request is a nonburst request, Q2 burst mode flip-flop 215-62 remains a binary ZERO.

The Q2 full signal Q2FULL010 loads signals representative of memory address bits 19-21 of the second memory request into Q2 counter 207-74 of FIG. 4. The remaining address bits 5-17 and 22 are loaded into queue 2 address registers 207-86 and 207-88 of FIG. 4 together with the state of signals BSADX3110 through BSADX5110. Additionally, Q2 full signal Q2FULL010 loads the states of control lines BSWRIT, BSDBPL and BSDBWD corresponding to signals BSWRIT110, BSDBPL110 and BSDBWD110 into Q2 command control register 208-12 of FIG. 5. At this time, the binary ONE state of boundary address signal BOUNDY110 from section 207 also is loaded into register 208-12.

During the third memory cycle of operation, the third word pair specified by the address contents of Q1 counter 207-72 are read out from memory.

Again, both words are transferred during the second half of the bus cycle designated by the third "1" portion of signal BSDCNN110 shown in FIG. 10a. Signal BSDCNN110 switches to a binary ONE on the positive going transition of the second signal MYDCNN010. This again forces line BSDCNN to a binary ONE state.

Signal NEWDCNN010 also causes AND gate 215-80 of FIG. 6 to force signal UPCNQ1000 to a binary ONE which again forces response signal DWRESP110 to a binary ONE. This, in turn, forces line BSDBPL to a binary ONE again signalling the memory requestor that more transfers of word pairs are to take place.

The signal UPCNO1000 causes Q1 address counter 207-72 to increment its address contents by one enabling read out of the next double word from memory.

At the end of the third queue cycle, signal BSDCNN110 is switched to a binary ZERO and signal MEMBUZ000 again resets Q1 cycle flip-flop 215-45 to a binary ZERO. This results in signal Q1Q2CY000 being forced to a binary ONE which again enables Q1,Q2 tristate control flip-flop 215-32 to switch state as a function of signal QPOINT010. As shown in FIG. 10a, flip-flop 215-32 switches to a binary ZERO state forcing signal Q1TRST010 to a binary ZERO as shown in FIG. 10a.

Hence, the next memory cycle will be carried out by the queue 2 circuits for processing the nonburst memory request. As seen from FIG. 10a, the signal Q2CYCL000 is forced to a binary ZERO by Q2 cycle flip-flop 215-44 switching to a binary ONE. As seen from FIG. 10a, Q2 cycle flip-flop 215-44 is switched to a binary ONE, since signal Q2TRST010 is a binary ONE.

The queue address signals applied to the output terminals of Q2 address registers 207-86 and 207-88 of FIG. 4 in response to signal Q1TRST010 are transferred to the RAM chips within stacks 210-20 and 210-40. Also, signals BSAD20210 and BSAD19210 from Q2 counter 207-74 selected by multiplexer circuit 207-76 in response to signal Q2TRST000 are decoded and transferred to the RAM chips within stacks 210-20 and 210-40.

The memory request address of the nonburst request stored within the queue 2 circuits of section 207-7 causes the contents of the pair of storage locations to be read out in response to signals MEREAD010 and MOREAD010 and transferred to bus 10 in the manner previously described during the second half of the bus cycle designated by the "2" portion of signal BSDCNN110.

Signal MYDCNN010, generated by the circuits of section 211, forces line BSDCNN to a binary ONE signalling the requestor of the transfer. Since the burst mode flip-flop 215-62 is a binary ZERO, AND gate 215-82 of FIG. 6 holds signal UPCNQ2000 at a binary ZERO. This, in turn, forces double wide response signal DWRESP110 to a binary ZERO. The result is that line BSDBPL is forced to a binary ZERO signalling the requestor that no more transfers are to take place.

As seen from FIG. 10a, at the completion of the queue 2 memory cycle of operation Q2 cycle flip-flop 215-44 switches to a binary ZERO state. This causes signal Q1Q2CY000 to switch to a binary ONE enabling Q1,Q2 tristate control flip-flop 215-32 to switch to a binary ONE state indicating that the queue 1 circuits are to execute the next memory cycle of operation.

As seen from FIG. 10a, the controller 200-1 during the next successive memory cycles of operation completes the processing of the burst request in addition to a second nonburst request in the same manner as described above.

Normally, the system of FIG. 1 can include up to 16 memory subsystems arranged in pairs of interleaved modules. That is, each pair of controllers has 512K words of addressable storage locations which are interleaved, such that the pair of modules of the first controller contains the first 16-word locations and the corresponding pair of modules of the second controller contains the next 16-word locations (i.e., modules A and C of controller 200-1 contain words 0–15 while modules A and C of controller 200-2 contain words 16–31).

Figure 10B:
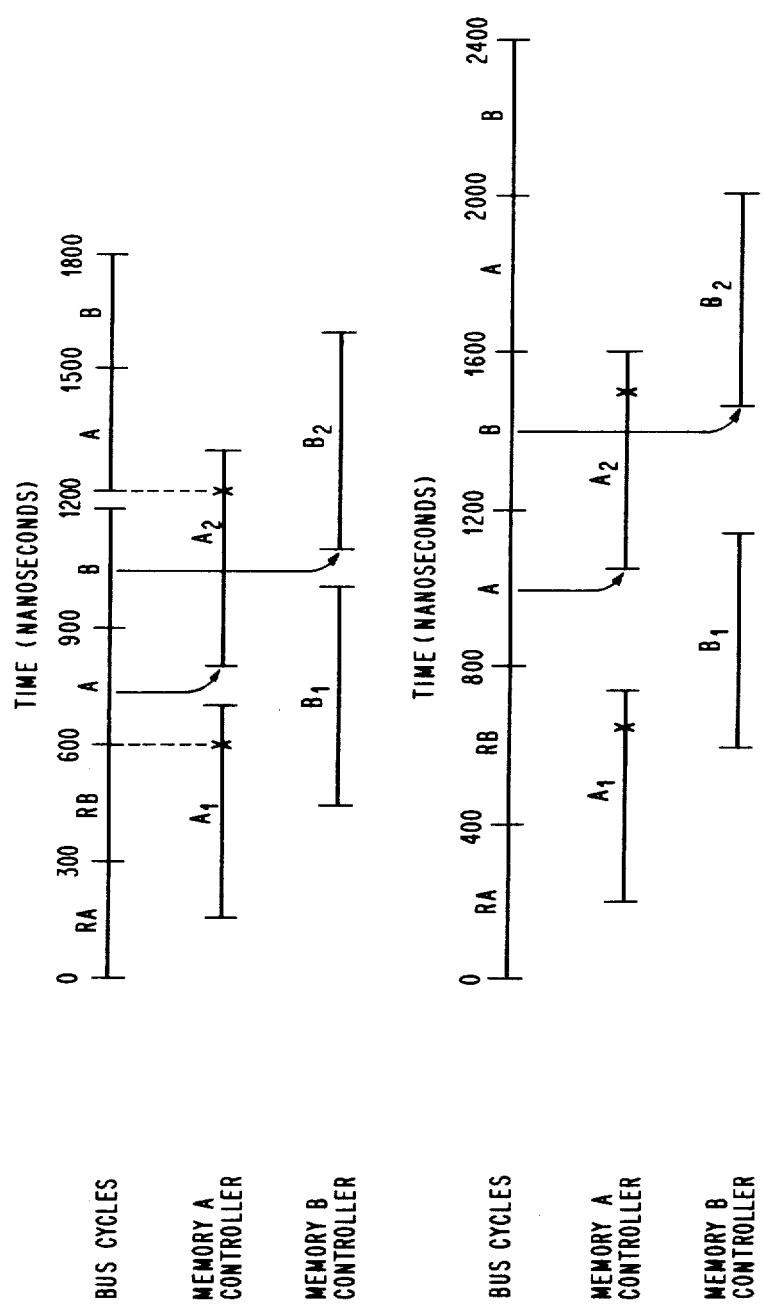

It will be appreciated that as memory controllers and disk controllers are added to bus 10, the length of bus 10 or requestor bus cycle increases or is extended. FIG. 10b compares bus operation in the type of system described in connection with FIG. 10a with bus operation in an extended bus.

The upper portion of FIG. 10b illustrates bus operation when the bus length or bus cycle duration is 300 nanoseconds for requestors and there are two burst read requests being processed by the system of FIG. 1. That is, each of the pair of controllers receives a burst read request for processing.

During the first bus cycle, a first requestor applies the first burst read request RA to bus 10 for memory controller A. Thus, during the first 300 nanosecond interval, bus 10 is occupied by the bus request RA. As soon as the burst request is stored, controller A initiates a memory cycle of operation A1 (becomes busy), as shown.

During the next 300 nanosecond interval, the next requestor applies the second burst read request RB to bus 10 for controller B. This, in turn, causes controller B to initiate a memory cycle of operation B1 (becomes busy), as shown. At the end of the second bus cycle RB, controller A will have requested and have been granted access to bus 10. Accordingly, during the next 300 nanosecond bus interval A1, controller A applies second half bus cycle signal BSDCNN to bus 10 for signalling the requestor that the first word pair read out from memory by controller A is being applied bus 10.

Controller A completes its first cycle and following the recycle time interval begins a next memory cycle A2. At the end of the bus data cycle A1, controller B will have requested and have been granted access to bus 10. Thus, during the fourth 300 nanosecond bus time interval, controller B applies second half bus cycle signal BSDCNN to bus 10 for signalling the requestor that the first word pair read out from memory by controller B is being applied to bus 10.

It will be noted from FIG. 10b that bus data cycle B1 is completed before controller A is granted access to bus 10 (begins a second data cycle of operation). During this time, bus 10 has no activity enabling other requestors to gain access to the controller's empty queue circuits. Accordingly, the system of FIG. 1 is able to process both burst and nonburst requests.

However, as seen from FIG. 10b, this is no longer possible when the length of bus 10 is increased to 400 nanoseconds. As seen from the Figure, there are no gaps of intervals of no inactivity on bus 10. Thus, the other units in the system of FIG. 1 (e.g. third and fourth disk controllers) are unable to gain access to the empty queue circuits in controllers A and B until both burst requests have been completed.

It will be appreciated that a similar situation occurs when a single disk controller initiates a burst read request and there is any activity by units other than the CPU taking place between the intervals between successive transfers of word pairs by the memory controller. Such activity prevents the low priority CPU from gaining access to the controller's empty queue circuit.

In the above situations, there is a corresponding decrease in system performance.

Figure 10C:
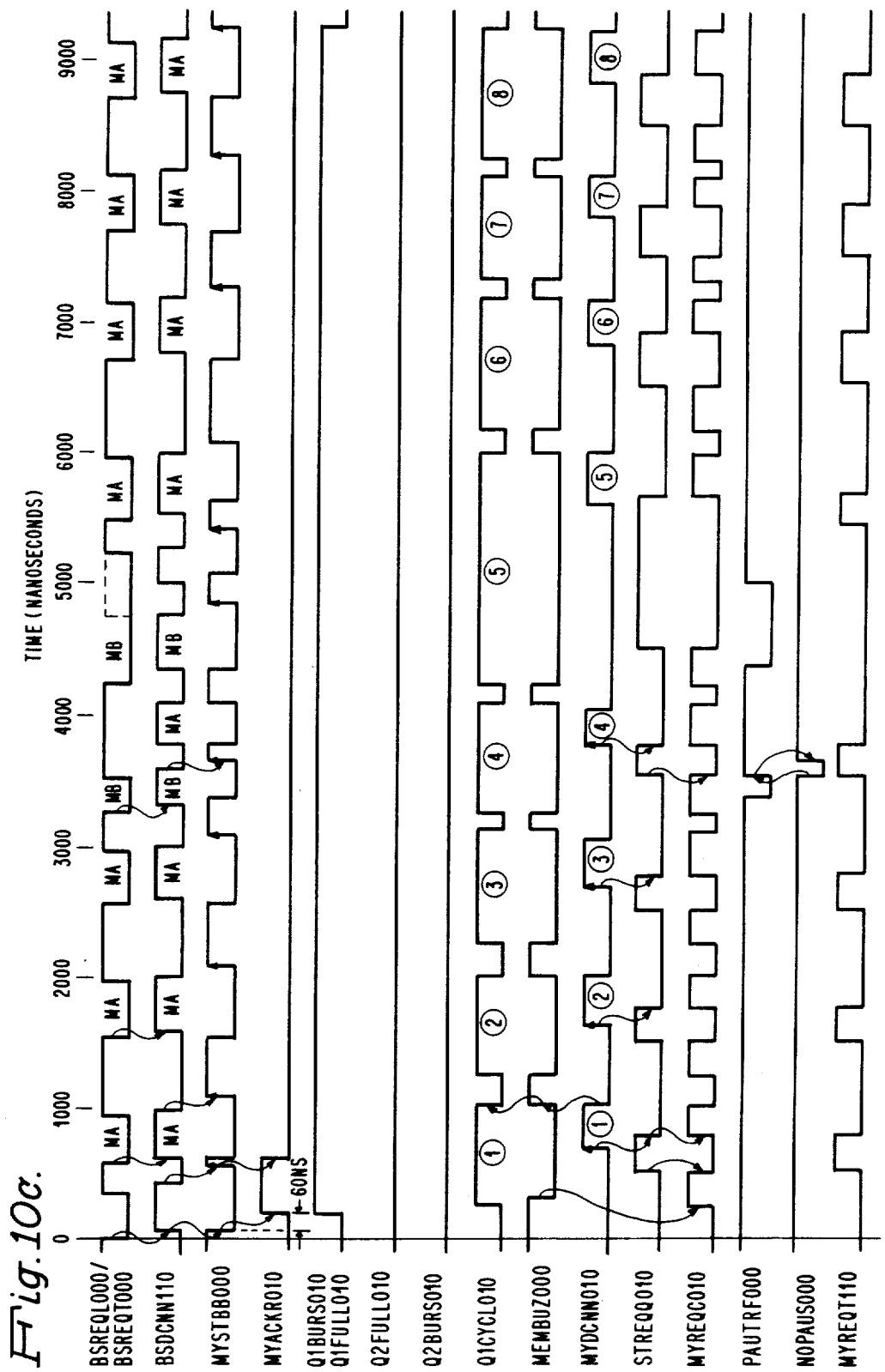
Figure 10D:
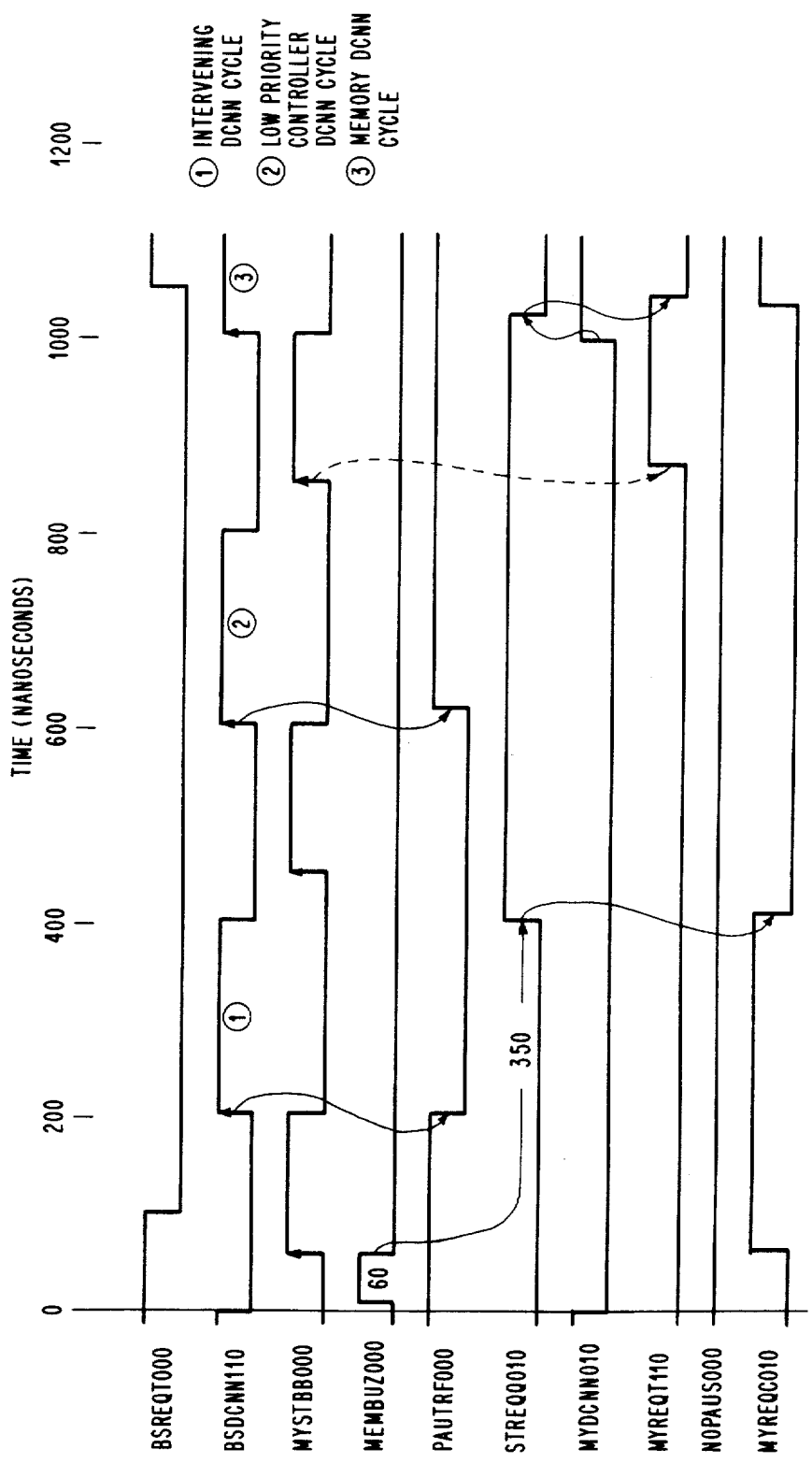

FIGS. 10c and 10d illustrate bus operation for a bus cycle time of 400 nanoseconds when the system of FIG. 1 includes the apparatus of the present invention. When there is no bus cycle occurring between a memory controller's burst data bus cycles of operation, the pause apparatus of the present invention does not alter the memory controller's operation. The same is true when there is a bus cycle occurring between the memory controller's bus data cycles and the available queue circuit is filled.

However, where a bus cycle occurs between the memory controller's bus data cycles and the available queue circuit is not filled, then the apparatus of the present invention alters the controller's operation by introducing a pause.

With reference to FIGS. 10c and 10d, the manner in which the apparatus of the present invention significantly improves bus access/utilization by low priority processing units (e.g. CPU 40) will be described. FIG. 10c illustrates bus operation when a single burst operation is received and then performed by one memory controller (MA) of the system of FIG. 1 which has one queue circuit filled and another memory controller (MB) requests access to bus 10.

As seen from FIG. 10c, when there is no intervening bus activity between the memory cycles of memory controller MA as shown by memory cycles 1, 2, 3, 6, 7 and 8 (e.g. signal Q1CYCL010 is a binary ONE), no pauses are generated by the circuits of section 211. When there is intervening bus activity between memory cycles of controller MA by another unit such as by memory controller MB and there are no other memory bus requests pending, no pauses are generated as shown in memory cycle 4. However, when there is intervening bus activity between the memory cycles of memory controller MA and there is a bus request pending, the circuits of section 211 generate a pause as shown in cycle 5.

Now, the above three situations will be discussed in greater detail. During cycles 1, 2, 3, 6, 7 and 8, the circuits of section 211 operate as follows.

Referring to FIG. 10c, it is seen that as a result of the bus request being applied to bus 10, receiver circuit 213-18 or 213-30 of controller MA forces signal BSREQL110 or BSREQT110 to a binary ONE. Thereafter, the requesting unit upon being granted access to bus 10 forces bus data cycle signal BSDCNN100 negative. This causes receiver circuit 213-16 of controller MA to force signal BSDCNN110 to a binary ONE as seen from FIG. 10c.

Since it is assumed the memory controller MA is not performing a memory cycle of operation (i.e., signal MEMBUZ000 is a binary ONE), NOR gate 211-18 of FIG. 7 causes signal MYREQC010 to remain a binary ZERO. Accordingly, a binary ZERO is clocked into pause flip-flop 211-22 in response to the switching of signal BSDCNN110 to a binary ONE. The result is that signal PAUTRF010 is a binary ZERO while signal PAUTRF000 is a binary ONE. The binary ZERO state of signal PAUTRF010 holds no pause flip-flop 211-24 in a binary ZERO state (i.e., signal PAUTRF010 is applied to the clear (CLR) terminal of flip-flop 211-24).

As seen from FIG. 10c, signal BSDCNN110 switches signal MYSTBB000 from a binary ONE to a binary ZERO. This in turn inhibits the operation of AND gate 211-136 of FIG. 7 which results in NOR gate 211-140 forcing signal BSSBSY00 to a binary ONE. Since the stored request flip-flop 211-102 of controller MA is in a binary ZERO state, NAND gate 211-134 holds signal MYREQR000 in a binary zero state. Thus, my request flip-flop 211-130 remains in a binary ZERO state. Similarly, signal MYSTBB000 causes NAND gate 211-146 to force signal PCNSET000 to a binary ONE causing flip-flop 211-150 of controller MA to switch to a binary ZERO.

Signal MYSTBB000 is inverted and applied to the clear input terminals of MYACKR and MYWAIT flip-flops 211-120 and 211-122 ensuring that both flip-flops are reset.

As seen from FIGS. 7 and 10c, 60 nanoseconds following the switching of signal BSDCNN110, controller MA switches its MYACKR flip-flop 211-120 to a binary ONE. That is, it is assumed that the request applied to bus 10 is a memory request having the format of either FIG. 9a or 9b and the controller address bits are coded to specify controller MA. Accordingly, since there is no wait condition (i.e., signal WAITXX010 is a binary ZERO) and the request is for controller MA (i.e., signal MYADG0100 is a binary ZERO), NOR gate 211-116 forces signal ACKGEN010 to a binary ONE. The binary ONE is clocked into flip-flop 211-120.

Signal MYACKR110 when switched to a binary ONE causes Q1 full flip-flop 215-10 to switch to a binary ONE. This results in the switching of Q1 cycle flip-flop 215-45 to a binary ONE indicating that the controller's queue 1 circuits are to process the request. Also, the queue 1 burst mode flip-flop 215-60 of FIG. 6 switches to a binary ONE indicating that the request specified a burst memory operation. As seen from FIG. 10c, signal MYACKR110 causes memory controller MA to switch signal MEMBUZ000 to a binary ZERO indicating that the controller has begun a memory cycle of operation.

As soon as signal MEMBUZ000 switches to a binary ZERO state, NOR gate 211-18 forces signal MYREQC010 to a binary ONE state as seen from FIG. 10c. That is, as previously mentioned, the request stored flip-flop 211-102 and the my request flip-flop 211-130 are both in binary ZERO states. Thus, both signals STREQQ010 and MYREQT010 are binary ZEROS. The binary ZERO states of these signals together with the binary ZERO state of signal ALPHUC010 results in signal MYREQC010 being switched to a binary ONE in response to signal MEMBUZ000.

Following acknowledgement of the request by memory controller MA, the resulting unit operates to switch the state of bus line BSDCNN indicating the completion of the data cycle. As seen from FIG. 10c, this causes bus data cycle BSDCNN110 to switch from a binary ONE to a binary ZERO. Approximately 60 nanoseconds after such switching, signal MYSTBB000 switches to a binary ONE. At this time, the activity state of bus 10 is sampled. That is, signal MYSTBB000 clocks the states of bus request signals BSREQL110 and BSREQT110 into no pause flip-flop 211-24 of FIG. 7. Since there are no requests outstanding at this time (i.e., both signals BSREQT110 and BSREQL110 are binary ZEROS), normally a binary ONE would be clocked into the no pause flip-flop 211-24. However, since the pause flip-flop 211-22 is already reset, the no pause flip-flop 211-24 is held in a binary ZERO state by signal PAUTRF010. Additionally, the switching of signal MYSTBB000 resets the controller's memory acknowledgement flip-flop 211-120 to a binary ZERO as seen from FIG. 10c.

At a predetermined time interval from the start of the first Q1 memory cycle, controller MA switches its stored request flip-flop 211-102 to a binary ONE. That is, the stored burst read request causes NOR gate 211-104 of FIG. 7 to force signal INREDY000 to a binary ONE. Thus, the positive going edge of signal DCNNG0010 switches flip-flop 211-102 to a binary ONE as seen from FIG. 10c.

As soon as signal STREQQ010 switches to a binary ONE, NOR gate 211-18 forces signal MYREQC010 to a binary ZERO as shown in FIG. 10c. This indicates that controller MA is initiating a request for access to bus 10. Since pause signal PAUTRF000 is a binary ONE, the binary ONE stored request signal STREQQ010 passes through NAND gate without delay and switches my request flip-flop 211-130 to a binary ONE.

As seen from FIG. 10c, the my request signal MYREQT010 is inverted and applied to bus 10 as signal BSREQT000 by driver circuit 213-14 of controller MA. As seen from FIG. 8, receiver circuit 213-20 inverts signal BSREQT000 and applies it as an input to no pause flip-flop 211-24 of FIG. 7.

Assuming there is no higher priority controller requesting access to bus 10, signal MYREQT010 causes NAND gate 211-146 to force signal DCNSET000 to a binary ZERO. As seen from FIG. 10c, this causes my cycle flip-flop 211-150 of controller MA to switch to a binary ONE. Signal MYDCNN010 is inverted and applied to bus 10 as signal BSDCNN100 by driver circuit 213-10. This results in receiver circuit 213-16 forcing signal BSDCNN110 to a binary ONE as shown in FIG. 10c. The positive going transition of signal BSDCNN110 clocks the binary ZERO state of signal MYREQC010 into pause flip-flop 211-22. Accordingly, signal PAUTROF010 remains a binary ZERO.

As seen from FIG. 10c, the positive going edge of signal MYDCNN010 switches stored request flip-flop 211-102 to a binary ZERO. Signal STREQQ010 causes NOR gate 211-18 of FIG. 7 to switch signal MYREQC010 to a binary ONE state. As soon as stored request flip-flop 211-102 switches to a binary ZERO, this clears my request flip-flop 211-130 to a binary ZERO. The result is that NAND gate 211-146 forces signal DCNSET000 to a binary ONE allowing flip-flop 211-150 to switch to a binary ONE state upon receiving signal DCNRES000.

As seen from FIG. 10c, when signal MYDCNN010 switches to a binary ZERO, this forces bus line BSDCNN positive which results in signal BSDCNN110 being forced to a binary ZERO. This signals the end of the data cycle. Also, signal MYDCNN010 causes controller MA to switch signal MEMBUZ000 to a binary ONE which results in signal Q1CYCL010 being switched to a binary ZERO.

Approximately 60 nanoseconds after signal BSDCNN110 switches to a binary ZERO, signal MYSTBB000 switches from a binary ZERO to a binary ONE. This normally clocks the states of signals BSREQL000 and BSREQT000 into no pause flip-flop 211-24. However, since signal PAUTRF000 is a binary ZERO, the no pause flip-flop 211-24 remains in its binary ZERO state as seen from FIG. 10c.

From the above, it is seen that memory controller MA does not generate a pause during a memory cycle of operation where the controller detects there is no intervening bus activity. The state of the bus is sampled on the trailing edge of signal MTSBB000 which occurs 60 nanoseconds after asynchronous bus data cycle signal BSDCNN110 switches from a binary ONE to a binary ZERO. Since there are no other bus requests present on bus 10 at this time, the circuits 211-10 do not generate a pause. Thus, there is no delay in controller MA issuing its request for accessing bus 10. The same is true for memory cycles 2, 3, 6, 7 and 8.

During the fourth memory cycle, memory controller MA accesses bus 10 which forces bus request signal BSREQT000 negative. This causes receiver circuit 213-20 of FIG. 8 to force signal BSREQT110 to a binary ONE. Also, assuming that memory controller MB has the highest priority, it thereafter forces bus data cycle signal BSDCNN100 negative as shown in FIG. 10c.

From FIG. 10c, it is seen that since memory controller MA is not in the process of issuing a bus request (i.e., there is no request stored), signal MYREQC010 is a binary ONE at the time asynchronous bus data cycle signal BSDCNN110 (MB) switches to a binary ONE. This results in a binary ONE being clocked into pause flip-flop 211-22. This results in signal PAUTRF000 being switched from a binary ONE to a binary ZERO.

As seen from FIG. 10c, there is no other activity on bus 10 at the completion of the bus data cycle MB allocated to memory controller MB (i.e., both signals BSREQT110 and BSREQL110 are binary ZEROS). Approximately 60 nanoseconds after signal BSDCNN110 switches to a binary ZERO, signal MYSTBB000 switches to a binary ONE. This clocks the binary ONE state of signal BSREQED000 indicative of bus activity into the no pause flip-flop 211-24 of controller MA as seen from FIG. 10c.

The result is that NOPAUS000 signal switches from a binary ONE to a binary ZERO. The NOPAUS000 signal resets pause flip-flop 211-22 to a binary ZERO state as seen from FIG. 10c. Thus, signal PAUTRF000 is switched to a binary ONE enabling the transfer of controller's stored request. Since the switching of signal PAUTRF000 occurs prior to the time that controller MA can access bus 10, there is a minimum delay in generating the controller's my request signal MYDCNN010.

From the above, it is seen that when another unit accesses bus 10 before controller MA has set its stored request flip-flop 211-102 and there are no additional requests thereafter (i.e., at the end of controller's MB data cycle both signals BSREQL110 and BSREQT110 are binary ZEROS), a binary ONE is clocked into the no pause flip-flop 211-24. This in turn resets the pause flip-flop 211-22 of controller MA. Therefore, by the time controller MA stored request is being transferred to bus 10, it will be delayed by the previous setting of the pause flip-flop 211-22. Thus, the apparatus of the present invention delays the issuing of controller MA request by a minimum amount when there is intervening bus activity from another requestor where there is no further bus activity.

Referring to FIGS. 10c and 10d, it is seen how the apparatus of the present invention generates a pause when intervening bus activity/cycle is followed immediately by another bus request. FIG. 10d illustrates the states of certain ones of the signals of FIG. 10c generated during the fifth memory cycle of operation of controller MA.

During the beginning of the fifth cycle, memory controller MA generates a bus request which results in signal BSREQT000 being forced negative. In response to signal BSREQT000, receiver circuit 213-20 forces signal BSREQT110 to a binary ONE. As seen from FIG. 10d, approximately 60 nanoseconds later after controller MB has been granted access to bus 10, it forces bus line BSDCNN negative which results in signal BSDCNN110 being forced to a binary ONE.

Just prior to the switching of signal BSDCNN110, controller MA begins a fifth memory cycle of operation. At that time, the controller switches memory busy signal MEMBUZ000 to a binary ZERO and Q1 cycle signal Q1CYCL010 to a binary ONE as seen from FIG. 10c.

Since controller MA has not begun processing a stored request (i.e., signals STREQQ010 and MYREQT010 are binary ZEROS), NOR gate 211-18 is operative to switch signal MYREQC010 to a binary ONE in response to signal MEMBUZ000 being switched to a binary ZERO. Accordingly, the positive going transition of signal BSDCNN110 clocks a binary ONE into pause flip-flop 211-22 of controller MA. As seen from FIG. 10d, this switches signal PAUTRF000 from a binary ONE to a binary ZERO.

At the end of the data cycle allocated to memory controller MB, the controller switches line BSDCNN from a negative to a positive value. This causes receiver circuit 213-16 of controller MA to force signal BSDCNN110 to a binary ZERO as shown in FIG. 10c. Approximately 60 nanoseconds later, signal MYSTBB000 switches to a binary ONE. At that time, bus 10 is sampled for activity. Since there is other activity on bus 10 as indicated by the state of signal BSREQT000 in FIGS. 10c and 10d, signal BSREQT110 from section 213 remains a binary ONE. This causes signal BSRQED000 of FIG. 7 to remain a binary ZERO.

At the trailing edge of signal MYSTBB000, a binary ZERO is clocked into no pause flip-flop 211-24. Accordingly, no pause signal NOPAUS000 remains a binary ONE as shown in FIGS 10c and 10d.

As seen from FIG. 10d, signal PAUTRF000 when a binary ZERO inhibits NAND gate 211-132 of FIG. 7 from enabling the stored request signal STREQQ010 from switching my request flip-flop 211-130 to a binary ONE. Accordingly, this delays controller MA's generation of signal MYDCNN010 (start of the next data cycle) for approximately one bus cycle as shown in FIG. 10d.

As seen from FIG. 10d, as soon as memory controller MA switches its stored request flip-flop 211-102 to a binary ONE, this causes NOR gate 211-18 to force signal MYREQC010 to a binary ZERO. As soon as the requesting unit has been granted access to bus 10, it forces bus line BSDCNN negative. This causes the receiver circuit 213-16 of controller MA to force signal BSDCNN110 to a binary ONE as shown in FIGS. 10c and 10d. This causes the binary ZERO state of signal MYREQC010 to be clocked into pause flip-flop 211-22 of controller MA. This causes signal PAUTRF000 to switch to a binary ONE state as shown in FIGS. 10c and 10d.

When signal PAUTRF000 is a binary ONE, NAND gate 211-132 is enabled to switch my request flip-flop 211-130 to a binary ONE state as soon as bus busy signal BSSBSY000 switches to a binary ONE. This occurs as soon as bus request signal BSREQT110 switches to a binary ZERO state signalling that there is no further activity on bus 10.

As seen from FIG. 10d, at the completion of the requesting unit's data cycle (B), bus line BSDCNN is switched to a positive state. This in turn causes section 213 of controller MA to switch signal BSDCNN110 to a binary ZERO state. Approximately 60 nanoseconds later, this causes signal MYSTBB000 to switch from a binary ONE to a binary ZERO state. Again, the activity state of bus 10 is sampled. As seen from FIG. 10d, since there are no other bus requests, both signals BSREQT110 and BSREQL110 are binary ZEROS. A binary ONE is clocked into no pause flip-flop 211-24, in response to the trailing edge of signal MYSTBB000, as shown in FIG. 10d. Since pause flip-flop 211-22 has already been reset to a binary ZERO state, there is no change in the state of signal PAUTRF000, as shown in FIG. 10d.

As seen from FIG. 10d, signal MYREQT110 causes controller MA to force signal BSREQT000 negative. When the controller MA has been granted access to bus 10, it switches flip-flop 211-150 to a binary ONE. This forces signal MYDCNN010 to a binary ONE forcing line BSDCNN negative. This in turn switches signal BSDCNN110 to a binary ONE as shown in FIG. 10d. This results in the resetting of the controller's stored request flip-flop 211-102. When signal STREQQ010 switches to a binary ZERO, this causes NAND gate 211-134 to force signal MYREQR000 to a binary ZERO. At that time, the controller's my request flip-flop 211-130 is reset to a binary ZERO as shown in FIG. 10d. Signal MYREQT010, upon being switched to a binary ZERO, causes NAND gate 211-146 to switch signal DCNSET000 to a binary ONE. This allows flip-flop 211-150 to switch to a binary ZERO by signal DCNRES000 as previously described.

At the end of the controller MA's data cycle, signalled by the switching of signal MYDCNN010 to a binary ZERO, line BSDCNN is returned to a positive state. This results in the switching of signal BSDCNN110 to a binary ZERO. Also, at that time, the controller MA switches memory busy signal MEMBUZ000 to a binary ONE as shown in FIG. 10d. At that time, signal MYREQC010 is switched to a binary ZERO.

From the above, it is seen how the apparatus of the present invention operates to delay the start of a controller's data cycle of operation when there is intervening bus activity followed by a further bus request. This enables the requesting unit access to the available queue circuit within the memory controller.

It will be appreciated that many changes may be made to the preferred embodiment of the present invention. For example, the number of queue circuits and the number of bus request networks can be increased.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A data processing system comprising a number of memory command generating units and a plurality of memory subsystems each of which connect to a bus, each subsystem including a controller for controlling the operation of a number of memory module units coupled to said controller in response to a number of different types of memory requests, said controller including queue circuit means for storing and processing said memory requests received from said plurality of memory command generating units, each of said controllers further including:

bus control circuit means coupled to said bus for generating signals for transferring data words during bus cycles of operation; and, pause control circuit means coupled to said queue circuit means, to said bus and to said bus control circuit means, said pause control circuit means including means for monitoring the activity of said bus, said monitoring means being operative to generate an output signal upon detecting a predetermined type of bus activity, said bus control circuit means being conditioned by said output signal to lengthen the time between successive bus cycles occurring during a predetermined type of data transfer operation carried out in response to the processing of a specific type of one of said memory requests for enabling said plurality of command generating units to access said queue circuit means when available for processing new requests in parallel with said predetermined type of data transfer operation.

2. The system of claim 1 wherein said queue circuit means includes:

control indicator logic circuit means coupled to said bus for generating signals indicative of whether or not the type of memory request being processed by said queue circuit means specifies said predetermined type of data transfer operation; and, request indicator logic means coupled to said queue circuit means for receiving signals indicating whether or not said queue circuit means is filled; and wherein said pause control means further includes:
logic circuit means coupled to said control indicator logic circuit means and to said request indicator logic means, said logic circuit means being operative to generate a mode signal indicating when said queue circuit means is not full and said controller is processing said predetermined type of transfer operation, said mode signal conditioning said pause control means to generate said output signal when said means for monitoring detects said predetermined type of bus activity.

3. The system of claim 2 wherein said means for monitoring includes first bistable means coupled to said bus and to said bus control circuits, said first bistable means being switched to a first state at the end of a transfer memory cycle by signals from said bus indicating the presence of an outstanding bus request corresponding to said predetermined type of bus activity on said bus.

4. The system of claim 3 wherein said pause control means further includes:
second bistable means coupled to said logic circuit means, to said bus control circuits and to said first bistable means, said second bistable means being switched to a predetermined state in response to said mode signal when said first bistable means is in said first state, said second bistable means when in said predetermined state generating said output signal for conditioning said bus control circuits to lengthen the time between said successive bus cycles.

5. The system of claim 4 wherein said logic circuit means further includes gating circuit means having a plurality of inputs and an output, said output being connected to said second bistable circuit means, a first input being connected to receive said mode signal, a second input being coupled to receive a first signal indicating the memory busy status of said controller and third and fourth inputs being coupled to said bus control circuits, said third input being connected to receive a second signal for indicating when said controller has a memory request stored and said fourth input being connected to receive a third signal for indicating when said controller has requested a bus cycle for processing said stored memory request, said gating circuit means being conditioned by the states of said signals applied to said second, third and fourth inputs to inhibit the switching of said second bistable means to said predetermined state in response to said mode signal.

6. The system of claim 5 wherein said gating circuit means inhibits said switching when said first signal indicates that said controller is not busy performing a cycle of operation.

7. The system of claim 5 wherein said gating circuit means inhibits said switching when said second signal indicates that said controller does have a stored bus request.

8. The system of claim 5 wherein said gating circuit means inhibits said switching when said third signal indicates that said controller has already requested a bus cycle of operation.

9. The system of claim 4 when said bus control circuits include:
first bistable request storage means coupled to said queue circuit means, said first request storage means being switched to a predetermined state for indicating when said controller queue circuit means has a memory request stored; and, second bistable request storage means coupled in series with said first bistable request storage means, coupled to said pause control means and to said bus, said second bistable request storage means being conditioned by said first bistable request storage means when in said predetermined state in the absence of said output signal from said pause control means to switch to said predetermined state for initiating the start of a next memory controller bus cycle within said successive bus cycles of operation and said second bistable request storage means being inhibited by said output signal from switching to said predetermined state in response to said memory request stored thereby delaying said start of said next memory controller bus cycle of operation enabling access to said available queue circuit means.

10. The system of claim 9 wherein said bus control circuits further include:
bus priority circuit resolution means coupled to said second bistable request storage means and to said bus; and, bistable data cycle request means coupled to said bus priority circuit resolution means and to said bus, said bistable data cycle request means being switched to said predetermined state by said bus priority circuit resolution means in response to the switching of said second bistable request storage means to said predetermined state when said bus priority circuit resolution means detects that said controller has access to said bus, said bistable data cycle request means when in said predetermined state being operative to apply signals to said bus during said next memory controller bus cycle for indicating that said controller is applying data words on said bus for transfer to a requesting one of said units.

11. A data processing system comprising a plurality of memory command generating units and a plurality of memory controllers which connect to an asynchronous common bus network, each controller controlling the operation of a number of memory module units coupled to said controller in response to a plurality of different types of memory requests, each request requiring one or more bus cycles of operation, said controller including at least a pair of queue circuits for receiving and storing memory requests from said plurality of memory command generating units, each of said controllers further including:
bus circuits coupled to said bus network for generating signals for transferring data over bus cycles of operation; and, pause control circuit means coupled to said pair of queue circuits, to said bus and to said bus control circuits, said pause control circuit means including means for monitoring the activity of said bus for a predetermined type of bus activity, said means for monitoring being operative when said queue circuits are not full during a predetermined type of transfer mode of operation to cause said pause control circuit means to generate an output signal, said bus control circuits being conditioned by said output signal to lengthen the time between successive bus cycles of operation for enabling said plurality of command generating units access to an available one of said queue circuits.

12. The system of claim 11 wherein said pair of queue circuits include:

control indicator logic circuit means coupled to said bus for generating signals indicative of whether or not the type of memory request being processed by one of said queue circuits specifies said predetermined type of transfer mode of operation; and, request indicator logic means coupled to said queue circuits for receiving signals indicating whether or not said queue circuits are full; and wherein said pause control means further includes:

logic circuit means coupled to said control indicator logic circuit means and to said request indicator logic means, said logic circuit means being operative to generate a mode signal indicating when one of said queue circuits is not full and said controller is processing said predetermined type of transfer operation, said mode signal conditioning said pause control means to generate said output signal when said means for monitoring detects said predetermined type of bus activity.

13. The system of claim 12 wherein said means for monitoring includes first bistable means coupled to said bus and to said bus control circuits, said bistable means being switched to a first state at the end of a transfer memory cycle by signals from said bus indicating the presence of an outstanding bus request on said bus corresponding to said predetermined type of bus activity.

14. The system of claim 12 wherein said pause control means further includes:

second bistable means coupled to said logic circuit means, to said bus control circuits and to said first bistable means, said second bistable means being switched to a predetermined state in response to said mode signal when said first bistable means is in said first state, said second bistable means when in said predetermined state generating said output signal for conditioning said bus control circuits to lengthen the time between said successive bus cycles.

15. The system of claim 14 wherein said logic circuit means further includes gating circuit means having a plurality of inputs and an output, said output being connected to said second bistable circuit means, a first input being connected to receive said mode signal, a second input being coupled to receive a first signal indicating the memory busy status of said controller and third and fourth inputs being coupled to said bus control circuits, said third input being connected to receive a second signal for indicating when said controller has a memory request stored and said fourth input being connected to receive a third signal for indicating when said controller has requested a bus cycle for processing said stored memory request, said gating circuit means being conditioned by the states of said signals applied to said second, third and fourth inputs to inhibit the switching of said second bistable means to said predetermined state in response to said mode signal.

16. The system of claim 15 wherein said gating circuit means inhibits said switching when said first signal indicates that said controller is not busy performing a cycle of operation.

17. The system of claim 15 wherein said gating circuit means inhibits said switching when said second signal indicates that said controller does have a stored bus request.

18. The system of claim 15 wherein said gating circuit means inhibits said switching when said third signal indicates that said controller has already requested a bus cycle of operation.

19. The system of claim 14 when said bus control circuits include:

first bistable request storage means coupled to said queue circuits, said first request storage being switched to a predetermined state for indicating when one of said controller queue circuits has a memory request stored; and, second bistable request storage means coupled in series with said first bistable request storage means, coupled to said pause control means and to said bus, said second bistable request storage means being conditioned by said first bistable request storage means when in said predetermined state in the absence of said output signal from said pause control means to switch to said predetermined state for initiating the start of a next memory controller bus cycle within said successive bus cycles of operation and said second bistable request storage means being inhibited by said output signal from switching to said predetermined state in response to said memory request stored delaying said start of said next memory controller bus cycle of operation enabling access to said available queue circuit by said command generating units.

20. The system of claim 19 wherein said bus control circuits further include:

bus priority circuit resolution means coupled to said second bistable request storage means and to said bus; and, bistable data cycle request means coupled to said bus priority circuit resolution means and to said bus, said bistable data cycle request means being switched to said predetermined state by said bus priority circuit resolution means in response to the switching of said second bistable request storage means to said predetermined state when said bus priority circuit resolution means detects that said controller has access to said bus, said bistable data cycle request means when in said predetermined state being operative to apply signals to said bus during said next memory controller bus cycle for indicating that said controller is applying data words on said bus for transfer to a requesting one of said units.

21. A data processing system comprising a plurality of memory command generating units and a plurality of memory controllers, each of which individually connect to an asynchronous common bus network, each controller controlling the operation of a plurality of memory module units in response to a plurality of different types of memory requests generated by said units requiring one or more bus cycles of operation, said each controller further including:

a plurality of queue circuits, each being coupled in common to said memory modules and to said bus network for receiving and storing a different one of said plurality of memory requests, each said queue circuit being operative to store said request for the number of memory cycles required to complete its processing and each said queue circuit being operative in response to said one request to control the operation of said memory modules as required for the processing of said request;

queue control means coupled to each of said plurality of queue circuits and to said bus network, said queue control means enabling for operation different ones of said plurality of queue circuit means for processing different ones of said memory requests stored in said queue circuits;

bus control circuits coupled to said bus network for generating signals for transferring data during bus cycles of operation; and, pause control circuit means coupled to said plurality of queue circuits, to said bus network and to said bus control circuits, said pause control circuit means including means for monitoring the activity of said bus network, said means being operative when said queue circuits are not full and one of said queue circuits is processing a predetermined type of memory request to generate an output signals, said bus control circuits being conditioned by said output signal to lengthen the time between succeeding bus cycles associated with said predetermined type of memory request to enable said plurality of command generating units access to an available one of said queue circuits.

22. The system of claim 21 wherein said pause control means further includes:

logic circuit means coupled to said queue control means and to said means for monitoring, said logic circuit means being operative to generate a mode signal indicating when said queue circuits are not full and said controller is processing said predetermined type of request, said mode signal conditioning said pause control means to generate said output signal indicating that said means for monitoring has detected said predetermined type of bus activity.

23. The system of claim 22 wherein said means for monitoring includes first bistable means coupled to said bus network and to said bus control circuits, said bistable means being switched to a first state at the end of a transfer memory cycle by signals from said bus network indicating the presence of an outstanding bus request on said bus network corresponding to said predetermined type of bus activity.

24. The system of claim 22 wherein said pause control means further includes:

second bistable means coupled to said logic circuit means, to said bus control circuits and to said first bistable means, said second bistable means being switched to a predetermined state in response to said mode signal when said first bistable means is in said first state, said second bistable means when in said predetermined state generating said output signal for conditioning said bus control circuits to lengthen the time between said succeeding bus cycles.

25. The system of claim 24 wherein said logic circuit means further includes gating circuit means having a plurality of inputs and an output, said output being connected to said second bistable circuit means, a first input being connected to receive said mode signal, a second input being coupled to receive a first signal indicating the memory busy status of said controller and third and fourth inputs being coupled to said bus control circuits, said third input being connected to receive a second signal for indicating when said controller has a memory request stored and said fourth input being connected to receive a third signal for indicating when said controller has requested a bus cycle for processing said memory request, said gating circuit means being conditioned by the states of said signals applied to said second, third and fourth inputs to inhibit the switching of said second bistable means to said predetermined state in response to said mode signal.

26. The system of claim 25 wherein said gating circuit means inhibits said switching when said first signal indicates that said controller is not busy performing a cycle of operation.

27. The system of claim 25 wherein said gating circuit means inhibits said switching when said second signal indicates that said controller does have a stored bus request.

28. The system of claim 25 wherein said gating circuit means inhibits said switching when said third signal indicates that said controller has already requested a bus cycle of operation.

29. The system of claim 24 when said bus control circuits include:

first bistable request storage means coupled to said queue circuits, said first request storage being switched to a predetermined state for indicating when one of said controller queue circuits has a memory request stored; and, second bistable request storage means coupled in series with said first bistable request storage means, coupled to said pause control means and to said bus, said second bistable request storage means being conditioned by said first bistable request storage means when in said predetermined state in the absence of said output signal from said pause control means to switch to said predetermined state for immediately initiating the start of a next memory controller bus cycle within said succeeding bus cycles of operation and said second bistable request storage means being inhibited by said output signal from switching to said predetermined state in response to said memory request stored delaying said start of said next memory controller bus cycle of operation enabling access to said available one of said queue circuits by said memory command generating units.

30. The system of claim 29 wherein said bus control circuits further include:

bus priority circuit resolution means coupled to said second bistable request storage means and to said bus network; and, bistable data cycle request means coupled to said bus priority circuit resolution means and to said bus network, said bistable data cycle request means being switched to said predetermined state by said bus priority circuit resolution means in response to the switching of said second bistable request storage means to said predetermined state when said bus priority circuit resolution means detects that said controller has access to said bus network, said bistable data cycle request means when in said predetermined state being operative to apply signals to said bus during said next memory controller bus cycle for indicating that said controller is applying data words on said bus network for transfer to one of said units.

* * * * *